United States Patent
Hirabayashi

(10) Patent No.: US 10,271,076 B2
(45) Date of Patent: *Apr. 23, 2019

(54) FILE GENERATION DEVICE AND METHOD, AND CONTENT PLAYBACK DEVICE AND METHOD

(71) Applicant: SONY CORPORATION, Tokyo (JP)

(72) Inventor: Mitsuhiro Hirabayashi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/317,970

(22) PCT Filed: Jun. 16, 2015

(86) PCT No.: PCT/JP2015/067231
§ 371 (c)(1),
(2) Date: Dec. 11, 2016

(87) PCT Pub. No.: WO2016/002493
PCT Pub. Date: Jan. 7, 2016

(65) Prior Publication Data
US 2017/0134768 A1    May 11, 2017

(30) Foreign Application Priority Data

Jun. 30, 2014 (JP) ................. 2014-134559

(51) Int. Cl.
*H04N 7/173* (2011.01)
*H04N 21/2387* (2011.01)
(Continued)

(52) U.S. Cl.
CPC ....... *H04N 21/2387* (2013.01); *H04N 21/233* (2013.01); *H04N 21/236* (2013.01);
(Continued)

(58) Field of Classification Search
CPC ............... H04N 21/234; H04N 21/235; H04N 21/23608; H04N 21/845; H04N 21/8455; H04N 21/8456; H04N 21/8453
See application file for complete search history.

(56) References Cited

U.S. PATENT DOCUMENTS

2002/0071485 A1* 6/2002 Caglar ............ H04N 21/23406
375/240.01
2003/0123744 A1* 7/2003 Chui .................... G06F 3/0481
382/240
(Continued)

FOREIGN PATENT DOCUMENTS

JP     2004-048299 A    2/2004
JP     2014-011638 A    1/2014
(Continued)

OTHER PUBLICATIONS

"Text of ISO/IEC 23009-1:2012 DAM 1 Support for Event Messages and Extended Audio Channel Configuration", ISO/IEC JTC1/SC29/WG11 MPEG2012/W13080, Shanghai, China, Nov. 2012, 42 pages.
(Continued)

*Primary Examiner* — Pankaj Kumar
*Assistant Examiner* — Timothy R Newlin
(74) *Attorney, Agent, or Firm* — Chip Law Group

(57) ABSTRACT

The present disclosure relates to a file generation device and a method, and a content playback device, enabling efficient access to arbitrary subsamples within a sample. As indicated by grouping_type='sgss', a subsample sample group (entry) structure is used as an sgpd. mha1 is identification information indicating 3d audio. As indicated by entry_count=3, the sgpd includes three entries. The three entries are defined to be mha1 0, mha1 1, and mha1 2. To assign these meanings of the sgpd to levels, the sgpd entries are linked to leva entries in index order. The present disclosure may be applied
(Continued)

to a content playback system equipped with a content server and a content playback device, for example.

12 Claims, 26 Drawing Sheets

(51) Int. Cl.
    *H04N 21/236* (2011.01)
    *H04N 21/238* (2011.01)
    *H04N 21/438* (2011.01)
    *H04N 21/233* (2011.01)
    *H04N 21/472* (2011.01)
    *H04N 21/81* (2011.01)
    *H04N 21/262* (2011.01)
    *H04N 21/4728* (2011.01)
    *H04N 21/854* (2011.01)

(52) U.S. Cl.
    CPC ..... *H04N 21/238* (2013.01); *H04N 21/26258* (2013.01); *H04N 21/438* (2013.01); *H04N 21/4728* (2013.01); *H04N 21/47217* (2013.01); *H04N 21/816* (2013.01); *H04N 21/85406* (2013.01)

(56) References Cited

U.S. PATENT DOCUMENTS

| | | | | |
|---|---|---|---|---|
| 2003/0142871 A1* | 7/2003 | Ishikawa | .................. | H04N 1/21 382/233 |
| 2004/0081334 A1* | 4/2004 | Hayashi | ................ | H04L 9/0836 382/100 |
| 2004/0156623 A1* | 8/2004 | Kato | .................... | G11B 27/034 386/241 |
| 2005/0144645 A1* | 6/2005 | Casey | .................. | G08B 27/005 725/95 |
| 2006/0233247 A1* | 10/2006 | Visharam | ........... | G11B 27/3027 375/240.12 |
| 2007/0051817 A1* | 3/2007 | Yano | ........................ | H04N 1/64 235/494 |
| 2009/0016622 A1* | 1/2009 | Itakura | ............... | H04N 21/2662 382/236 |
| 2009/0285239 A1* | 11/2009 | Arkhipenkov | .......... | H04H 20/30 370/474 |
| 2013/0195424 A1* | 8/2013 | Ohashi | ............... | H04N 21/4332 386/241 |
| 2013/0223456 A1* | 8/2013 | Kim | ........................ | H04L 69/22 370/474 |
| 2016/0014480 A1* | 1/2016 | Maze | .................. | H04N 21/4728 725/116 |
| 2017/0103765 A1* | 4/2017 | Lee | ........................ | G10L 19/167 |

FOREIGN PATENT DOCUMENTS

| | | |
|---|---|---|
| JP | 2014-030187 A | 2/2014 |
| JP | 2014-057227 A | 3/2014 |
| WO | 2014/002619 A1 | 1/2014 |
| WO | 2014/057896 A1 | 4/2014 |

OTHER PUBLICATIONS

"Text of ISO/IEC 23009-1:2012 DAM 1 Support for Event Messages and Extended Audio Channel Configuration", Coding of Moving Pictures and Audio, ISO/IEC JTC1/SC29/WG11, Nov. 2012, 41 pages.

Office Action for JP Patent Application No. 2016-531238, dated Dec. 25, 2018, 4 pages of Office Action.

* cited by examiner

FIG. 7

```
aligned(8) class SubSampleInformationBox
    extends FullBox('subs', version, 0) {
    unsigned int(32) entry_count;
    int i,j;
    for (i=0; i < entry_count; i++) {
        unsigned int(32) sample_delta;
        unsigned int(16) subsample_count;
        if (subsample_count > 0) {
            for (j=0; j < subsample_count; j++) {
                if(version == 1)
                {
                    unsigned int(32) subsample_size;
                }
                else
                {
                    unsigned int(16) subsample_size;
                }
                unsigned int(8) subsample_priority;
                unsigned int(8) discardable;
                unsigned int(32) reserved = 0;
            }
        }
    }
}
```

FIG. 8

For the use of the sub-sample information box (8.7.7 of ISO/IEC 14496-12) in an HEVC stream, a sub-sample is defined on the basis of the value of the flags field of the sub-sample information box as specified below. The presence of this box is optional; however, if present in a track containing HEVC data, it shall have the semantics defined here.

flags specifies the type of sub-sample information given in this box as follows:

0: NAL-unit-based sub-samples. A sub-sample contains one or more contiguous NAL units.
1: Decoding-unit-based sub-samples. A sub-sample contains exactly one decoding unit.
2: Tile-based sub-samples. A sub-sample either contains one tile and the associated non-VCL NAL units, if any, of the VCL NAL unit(s) containing the tile, or contains one or more non-VCL NAL units.
3: CTU-row-based sub-samples. A sub-sample either contains one CTU row within a slice and the associated non-VCL NAL units, if any, of the VCL NAL unit(s) containing the CTU row or contains one or more non-VCL NAL units. This type of sub-sample information shall not be used when entropy_coding_sync_enabled_flag is equal to 0.
4: Slice-based sub-samples. A sub-sample either contains one slice (where each slice may contain one or more slice segments, each of which is a NAL unit) and the associated non-VCL NAL units, if any, or contains one or more non-VCL NAL units.

FIG. 9

For the use of the sub-sample information box (8.7.7 of ISO/IEC 14496-12) in an 3D aduio stream, a sub-sample is defined on the basis of the value of the flags field of the sub-sample information box as specified below. The presence of this box is optional; however, if present in a track containing 3D audio data, it shall have the semantics defined here. flags specifies the type of sub-sample information given in this box as follows:

0: channel audio decoding frame sub-sample
1: HOA audio decoding frame sub-sample
2: Object-based sub-samples.
3: 3d audio metadata sub-sample

FIG. 10

```
Class Sub-sampleGroupEntry() extends VisualSampleGroupEntry('sgss')
{
    unsign int(32) codec_parameter;
    bit(24) sub_sample_flags;
    bit(8) reserved=0;
}
```

Semantics
codec parameter    IDENTIFICATION INFORMATION EXPRESSING CODEC INFORMATION
Flags              FLAGS DEFINING SUB-SAMPLES FOR EACH CODEC

FIG. 13

```
Class AudioObjectSampleGroupEntry() extends AudioSampleGroupEntry('aoif')
{
    unsigned int(16) objectTheta;
    unsigned int(16) objectGamma;
    unsigned int(16) objectLength;
    unsigned int(16) maxObjectTheta1;
    unsigned int(16) maxObjectTheta2;
    unsigned int(16) objectGamma1;
    unsigned int(16) objectGamma2;
    unsigned int(16) objectLength1;
    unsigned int(16) objectLength2;
};
```

Semantics
objectTheta        HORIZONTAL CERTAINTY INDICATING OBJECT POSITION
objectGamma        VERTICAL CERTAINTY INDICATING OBJECT POSITION
objectLength       DISTANCE INDICATING OBJECT POSITION
maxObjectTheta1    LEFTMOST HORIZONTAL CERTAINTY INDICATING OBJECT POSITION
maxObjectTheta2;   RIGHTMOST HORIZONTAL CERTAINTY INDICATING OBJECT POSITION
objectGamma1;      TOPMOST VERTICAL CERTAINTY INDICATING OBJECT POSITION
objectGamma2       BOTTOMMOST VERTICAL CERTAINTY INDICATING OBJECT POSITION
objectLength1;     SHALLOWEST DISTANCE IN DEPTH DIRECTION INDICATING OBJECT POSITION
objectLength2;     DEEPEST DISTANCE IN DEPTH DIRECTION INDICATING OBJECT POSITION

FIG. 14

```
Class Sub-sampleGroupEntry() extends VisualSampleGroupEntry('sgss')
{
    unsign int(32) codec_parameter;
    bit(24) sub_sample_flags;
    bit(8) reserved=0;
    unsigned int(16) num_of_sample_group;
    for (j=0; j < num_of_sample_group; j++) {
        unsigned int (32) sample_group_entry;
        unsigned int (32) sampe_group_entry_index;
    }
}
```

STORE SAMPLE GROUP ENTRY AND INDEX REFERENCING THIS SAB-SAMPLE

FIG. 16

```
Class SampleGroupSetEntry() extends VisualSampleGroupEntry('sgsg')
{
    unsigned int(16)num_of_sample_group_set;          // SAMPLE GROUP SET GROUPING
    for (i=0; i < num_of_sample_group_set; i++) {      // MULTIPLE SAMPLE GROUPS
        unsigned int(16) num_of_sample_group;
        for (j=0; j < num_of_sample_group; j++) {
            unsigned int (32) sample_group_entry;      // STORE SAMPLE GROUP ENTRY
            unsigned int (32) sampe_group_entry_index; // AND INDEX REFERENCING THIS
                                                        // SAMPLE GROUP SET
        }
    }
}
```

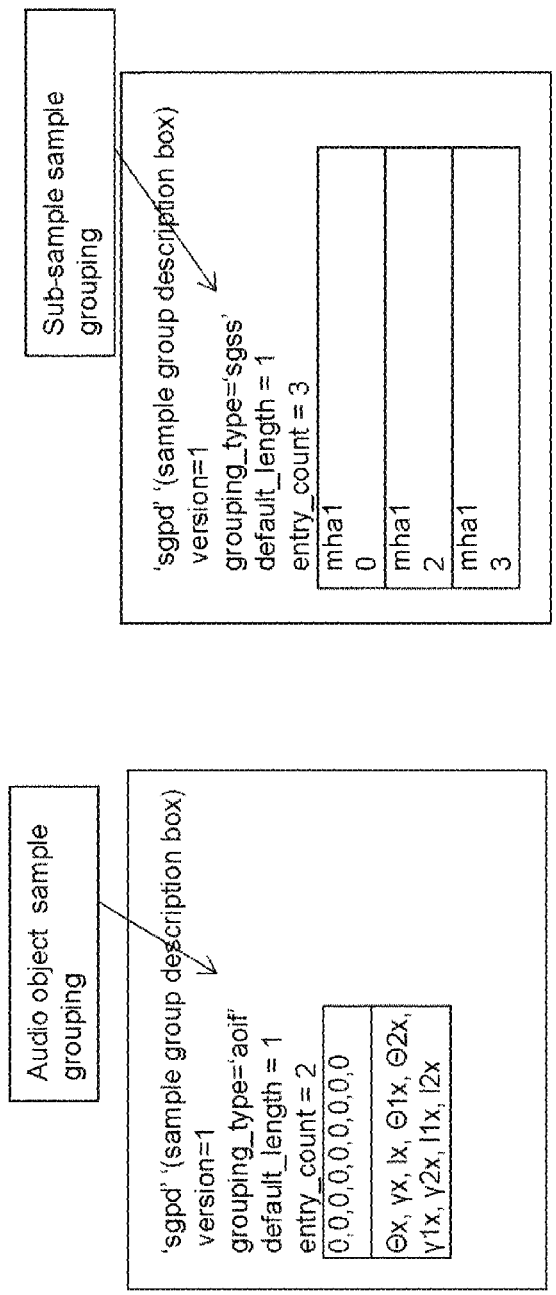

FIG. 20

| | GOOD POINT | BAD POINT |
|---|---|---|
| METHOD 1 | SINCE SEPARATELY DEFINED SAMPLE GROUP IS SIMPLY REFERENCED FROM NEWLY DEFINED sgss, EXTENSION COMES AT NO COST | SINCE EXTENSION HAS NO VERSATILITY, IT IS NECESSARY TO COPE WITH SIMILAR REQUISITES INDIVIDUALLY |
| METHOD 2 | SINCE SAMPLE GROUP GROUPING MULTIPLE SAMPLE GROUPS IS DEFINED, THE METHOD IS HIGHLY VERSATILE, AND MAY BE REALIZED IN ANY COMBINATION | NEW EXTENSION FOR GROUPING SAMPLE GROUPS BECOMES NECESSARY |
| METHOD 3 | SINCE LEVELS ARE SIMPLY SET IN THE LEVEL ASSIGNMENT BOX FOR EACH SAMPLE GROUP, ADDITIONAL DEFINITIONS ARE UNNECESSARY. ADDITIONAL OPERATING STIPULATIONS MAY BE ACCOMMODATED. | LEVEL ASSIGNMENT BOXES EQUAL TO THE NUMBER OF GROUPS OF SAMPLE GROUPS BECOMES NECESSARY, AND THE DATA STRUCTURE INSIDE FILES BECOMES VERBOSE | and method, and a content playback device and method, and more particularly, to a file generation device and method, and a content playback device and method, enabling efficient access according to data type within a segment.

FILE GENERATION DEVICE AND METHOD, AND CONTENT PLAYBACK DEVICE AND METHOD

CROSS REFERENCE TO RELATED APPLICATIONS

This application is a U.S. National Phase of International Patent Application No. PCT/JP2015/067231 filed on Jun. 16, 2015, which claims priority benefit of Japanese Patent Application No. JP 2014-134559 filed in the Japan Patent Office on Jun. 30, 2014. Each of the above-referenced applications is hereby incorporated herein by reference in its entirety.

TECHNICAL FIELD

The present disclosure relates to a file generation device and method, and a content playback device and method, and more particularly, to a file generation device and method, and a content playback device and method, enabling efficient access according to data type within a segment.

BACKGROUND ART

International standardization of the next-generation video delivery technology MPEG Dynamic Adaptive Streaming over HTTP (MPEG-DASH) was confirmed in December 2011. MPEG-DASH is an adaptive streaming technology that uses the same HyperText Transfer Protocol (HTTP) as websites for the communication protocol of video delivery.

In MPEG-DASH, information for acquiring a segment of arbitrary time is stated in the MPD. In order to acquire data of arbitrary time within a segment file, access information of a subsegment within the segment is stated in the sidx at the beginning of the segment file. Furthermore, in order to acquire only arbitrary I/P pictures for the purpose of trick play and the like, information about the dependence level of IPB pictures and their size information are stated in the ssix following the sidx at the beginning of the segment file.

The sidx and the ssix are general-purpose access information that do not require interpretation of the MP4 (moof) structure, and may also be utilized as access information for a stream such as an MPEG-2 TS (see Non-Patent Literature 1).

CITATION LIST

Non-Patent Literature

Non-Patent Literature 1: MPEG-DASH (Dynamic Adaptive Streaming over HTTP) (URL: http://mpeg.chiariglione.org/standards/mpeg-dash/media-presentation-description-and-segment-formats/text-isoiec-23009-12012-dam-1)

SUMMARY OF INVENTION

Technical Problem

However, in HEVC, a tiled structure is used, which enables an application to decode only a region requiring decoding. However, if MPEG-DASH is made to support a tiled structure, the tiles are treated as subsamples, and in the ssix discussed above, only I/B/P access information in units of pictures may be stated.

Consequently, accessing an arbitrary tile within a picture requires analyzing the subsample information in the moof and the like, which increases the amount of processing before the acquisition of the actual data, and is not efficient at data acquisition.

However, extensions beyond the sidx/ssix are not desirable. Instead, it is desirable to utilize the existing structure as much as possible.

The present disclosure has been devised in light of such circumstances, and enables efficient access to an arbitrary subsample within a sample.

A file generation device according to a first aspect of the present disclosure includes: a subsample information generation unit that defines a sample group of subsamples using a definition flag to define subsamples in a file including a bit stream generated by encoding content obtained by partitioning an image into a plurality of subsamples, and generates subsample access information to access subsamples; and a file generation unit that generates the file by multiplexing the subsample access information generated by the subsample information generation unit.

The subsample information generation unit may generate the subsample access information by mapping defined sample group of subsamples to a level.

The subsample information generation unit may generate the subsample access information by grouping together a sample group that expresses subsample position information and the sample group of subsamples, and then mapping to a level.

The subsample information generation unit may generate the subsample access information by defining a sample group storing reference information to a sample group that expresses subsample position information and the sample group of subsamples to thereby group the sample groups together, and mapping the sample group storing the reference information to a level.

The subsample information generation unit may generate the subsample access information by defining a sample group set bundling a sample group that expresses subsample position information and the sample group of subsamples to thereby group the sample groups together, and mapping the sample group storing the reference information to a level.

The subsample information generation unit may generate the subsample access information by grouping together a sample group that expresses subsample position information and the sample group of subsamples, and then mapping each of the sample groups to respective levels.

The subsamples may be tiles.

The subsamples may be 3D audio.

The file generation device may further include an encoding unit that encodes the content in which an image is partitioned into a plurality of subsamples, and thereby generates the bit stream.

A file generation method according to the first aspect of the present disclosure includes: defining, by a file generation device, a sample group of subsamples using a definition flag to define subsamples in a file including a bit stream generated by encoding content obtained by partitioning an image into a plurality of subsamples, and generating subsample access information to access subsamples; and generating, by the file generation device, the file by multiplexing the generated subsample access information.

A content playback device according to a second aspect of the present disclosure includes: an information acquisition unit that acquires subsample access information from a multiplexed file in which a sample group of subsamples is defined using a definition flag to define subsamples in a file including a bit stream generated by encoding content obtained by partitioning an image into a plurality of subsamples, and in which a subsample access information to access subsamples is thereby generated; a sample acquisition unit that acquires arbitrary subsamples using the subsample access information acquired by the acquisition unit; and a playback unit configured to play back arbitrary subsamples acquired by the sample acquisition unit.

The subsample access information may be generated by mapping defined sample group of subsamples to a level.

The subsample access information may be generated by grouping together a sample group that expresses subsample position information and the sample group of subsamples, and then mapping to a level.

The subsample access information may be generated by defining a sample group storing reference information to a sample group that expresses subsample position information and the sample group of subsamples to thereby group the sample groups together, and mapping the sample group storing the reference information to a level.

The subsample access information may be generated by defining a sample group set bundling a sample group that expresses subsample position information and the sample group of subsamples to thereby group the sample groups together, and mapping the sample group storing the reference information to a level.

The subsample access information may be generated by grouping together a sample group that expresses subsample position information and the sample group of subsamples, and then mapping each of the sample groups to respective levels.

The subsamples may be tiles.

The subsamples may be 3D audio.

The content may be stored on a server connected via a network.

A content playback method according to the second aspect of the present disclosure includes: acquiring, by a content playback device, subsample access information from a multiplexed file in which a sample group of subsamples is defined using a definition flag to define subsamples in a file including a bit stream generated by encoding content obtained by partitioning an image into a plurality of subsamples, and in which subsample access information to access subsamples is thereby generated; acquiring, by the content playback device, arbitrary subsamples using acquired subsample access information; and playing back, by the content playback device, acquired arbitrary subsamples.

According to the first aspect of the present disclosure, a sample group of subsamples is defined using a definition flag to define subsamples in a file including a bit stream generated by encoding content obtained by partitioning an image into a plurality of subsamples, and subsample access information to access subsamples is generated. Then, the file is generated by multiplexing the generated subsample access information.

According to the second aspect of the present disclosure, subsample access information is acquired from a multiplexed file in which a sample group of subsamples is defined using a definition flag to define subsamples in a file including a bit stream generated by encoding content obtained by partitioning an image into a plurality of subsamples, and in which subsample access information to access subsamples is thereby generated. Then, arbitrary subsamples are acquired using acquired subsample access information, and the acquired arbitrary subsamples are played back.

Note that the above file generation device and content playback device each may be an independent device, or an internal block constituting part of a single device.

Advantageous Effects of Invention

According to a first aspect of the present disclosure, a file may be generated. Particularly, access according to data type within a segment may be conducted efficiently.

According to a second aspect of the present disclosure, content may be played back. Particularly, access according to data type within a segment may be conducted efficiently.

Note that the advantageous effects described in this specification are merely for the sake of example. The advantageous effects of the present technology are not limited to the advantageous effects described in this specification, and there may be additional advantageous effects.

BRIEF DESCRIPTION OF DRAWINGS

FIG. 7 is a diagram illustrating an example of a subsample information box.

FIG. 8 is a diagram illustrating an example of definitions of HVEC subsamples.

FIG. 9 is a diagram illustrating an example of definitions of 3D audio subsamples.

FIG. 10 is a diagram illustrating an example of a definition of a subsample sample group of the present technology.

FIG. 13 is a diagram illustrating an example of a sample group that stores position information for a 3d audio object.

FIG. 14 is a diagram explaining a Method 1 of grouping multiple sample groups.

FIG. 16 is a diagram explaining a Method 1 of grouping multiple sample groups.

FIG. 17A and FIG. 17B are diagrams illustrating an example of Method 2 of grouping multiple sample groups.

FIG. 20 is a diagram illustrating a comparison of Methods 1 to 3 of grouping multiple sample groups.

DESCRIPTION OF EMBODIMENT(S)

Hereinafter, embodiments for carrying out the present disclosure (hereinafter designated embodiments) will be described. Hereinafter, the description will proceed in the following order.
1. First embodiment (information processing system)
2. Second embodiment (computer)

First Embodiment (Configuration of Information Processing System)

Figure 1:
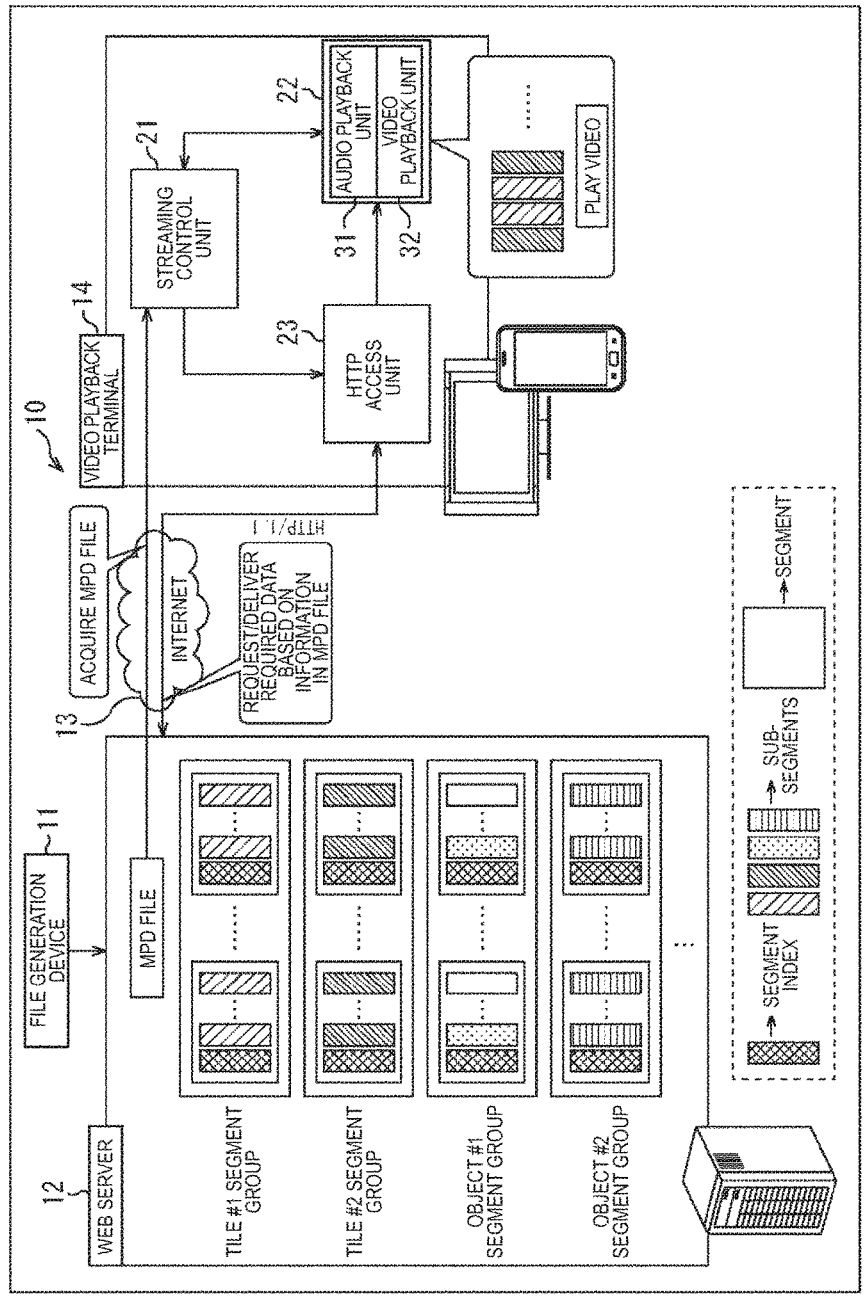
FIG. 1 is a diagram explaining an example configuration of an information processing system applying the present disclosure.

FIG. 1 is a diagram explaining an example configuration of an information processing system applying the present disclosure.

The information processing system 10 in FIG. 1 is configured by connecting a web server 12, which is connected to a file generation device 11, to a video playback terminal 14 over the Internet 13.

In the information processing system 10, the web server 12 delivers the image data of video content in tile units to the video playback terminal 14 (tiled streaming) according to a scheme conforming to MPEG-DASH.

Specifically, the file generation device 11 acquires and codes the image data of video content in tile units to generate a video stream. The file generation device 11 converts the video stream of each tile into files called segments, which are time units from a few seconds to approximately 10 seconds long. The file generation device 11 uploads the image files of each tile obtained as a result to the web server 12.

In addition, the file generation device 11 acquires the audio data of video content for individual objects (discussed in detail later), and codes the audio data in object units to generate an audio stream. The file generation device 11 converts the audio stream of each object into files in segment units, and uploads the audio files of each object obtained as a result to the web server 12.

Note that an object refers to a sound source, and the audio data of each object is acquired by a microphone or the like attached to that object. An object may be a stationary object, such as a microphone stand, or a moving object, such as a person.

The file generation device 11 codes audio metadata, including information such as object position information (audio position information) expressing the position of each object (the acquisition position of the audio data), and an object ID, which is an ID unique to the object. The file generation device 11 converts the coded data of the audio metadata into files in segment units, and uploads the audio metafiles obtained as a result to the web server 12.

In addition, the file generation device 11 generates a Media Presentation Description (MPD) file (control information) that manages image files and audio files, including information such as frame size information expressing the frame size of the images of the video content, and tile position information expressing the position, in the image, of each tile. The file generation device 11 uploads the MPD file to the web server 12.

The web server 12 stores the image files, audio files, audio metafiles, and MPD file uploaded from the file generation device 11.

In the example of FIG. 1, the web server 12 stores a segment group made up of the image files of multiple segments of a tile with a tile ID of "1", and a segment group made up of the image files of multiple segments of a tile with a tile ID of "2". Also, the web server 12 stores a segment group made up of the audio files of multiple segments of an object with an object ID of "1", and a segment group made up of the audio files of multiple segments of an object with an object ID of "2". Although omitted from illustration, a segment group of the audio metafiles is also stored similarly.

Note that in the following, a tile with a tile ID of i will be referred to as Tile #i, while an object with an object ID of i will be referred to as Object #i.

The web server 12 functions as a transmission unit, and in response to requests from the video playback terminal 14, transmits stored image files, audio files, audio metafiles, an MPD file, and the like to the video playback terminal 14.

The video playback terminal 14 includes a streaming control unit 21, a playback unit 22, and an HTTP access unit 23. The playback unit 22 is made up of an audio playback unit 31 and a video playback unit 32.

The streaming control unit 21 is software that controls data streamed from the web server 12, is executed by the video playback terminal 14, and functions on the video playback terminal 14. The streaming control unit 21 causes the video playback terminal 14 to acquire an MPD file from the web server 12.

Additionally, the streaming control unit 21 specifies a tile inside a display area, based on the display area, which is an area to display inside the image of video content indicated by the video playback unit 32, and tile position information included in the MPD file. Subsequently, the streaming control unit 21 orders the HTTP access unit 23 to issue a transmission request for the image file of that tile.

Also, the streaming control unit 21 orders the HTTP access unit 23 to issue a transmission request for the audio metafile. Subsequently, the streaming control unit 21 specifies an object corresponding to the image inside the display area, based on the display area, frame size information included in the MPD file, and object position information included in the audio metafile. Subsequently, the streaming control unit 21 orders the HTTP access unit 23 to issue a transmission request for the audio file of that object.

The audio playback unit 31 is software that plays back audio files acquired from the web server 12, is executed by the video playback terminal 14, and functions on the video playback terminal 14. The video playback unit 32 is software that plays back image files acquired from the web server 12, is executed by the video playback terminal 14, and functions on the video playback terminal 14.

Specifically, if a display area is specified by the user, the video playback unit 32 indicates the display area to the streaming control unit 21. The video playback unit 32 decodes and outputs an image file acquired from the web server 12 according to the indication. The audio playback unit 31 decodes and outputs an audio file acquired from the web server 12 according to the indication.

The HTTP access unit 23 is software that controls communication with the web server 12 over the Internet 13 using HTTP, is executed by the video playback terminal 14, and functions on the video playback terminal 14.

Specifically, in response to orders by the streaming control unit 21, the HTTP access unit 23 causes the video playback terminal 14 to transmit transmission requests for image files, audio files, and audio metafiles. The HTTP access unit 23 also causes the video playback terminal 14 to receive image files, audio files, and audio metafiles transmitted from the web server 12 according to the transmission requests.

(Example of Tiles)

Figure 2:
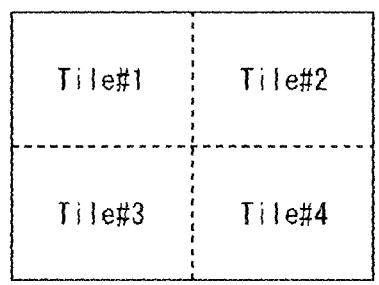
FIG. 2 is a diagram illustrating an example of tiles.

FIG. 2 is a diagram illustrating an example of tiles.

As illustrated in FIG. 2, an image of video content is partitioned into multiple tiles, and tile IDs are assigned to each of the tiles in order from 1. In the example of FIG. 2, the image of video content is partitioned into four tiles from Tile #1 to Tile #4.

(Description of Objects)

Figure 3:
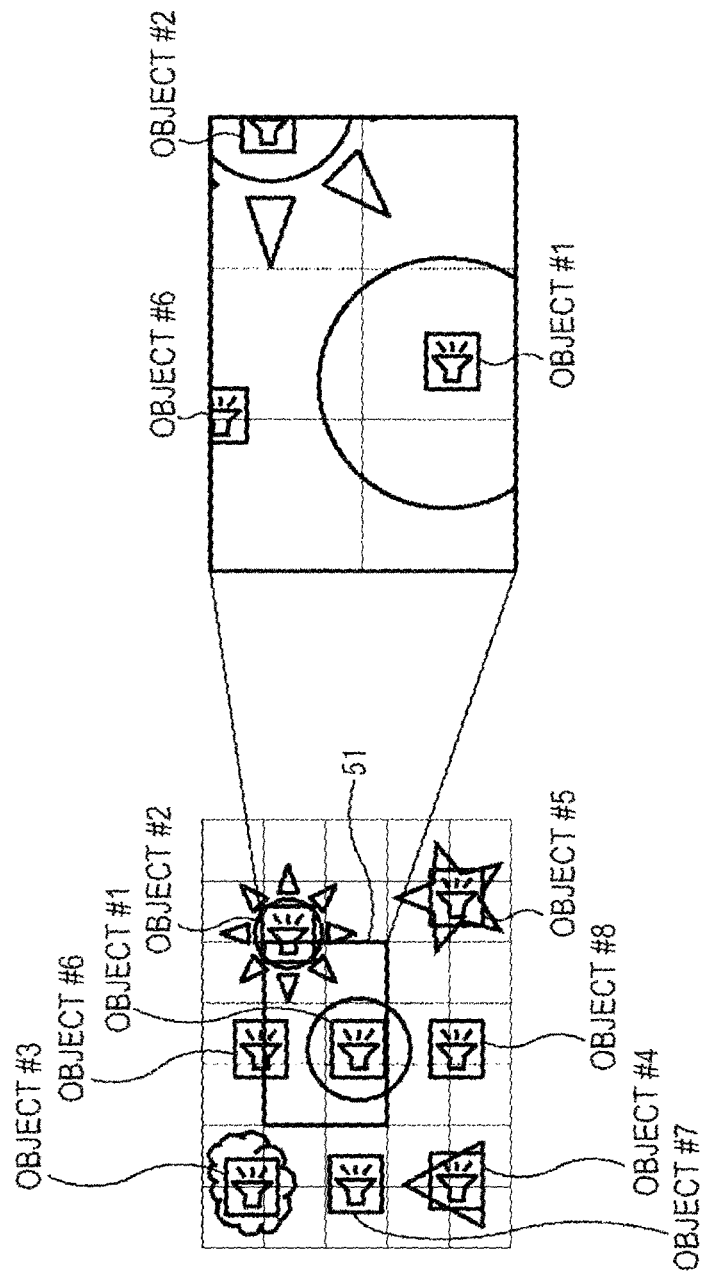
FIG. 3 is a diagram explaining objects.

FIG. 3 is a diagram explaining objects.

In the example of FIG. 3, the audio of eight objects inside an image are acquired as the audio of the video content, and object IDs are assigned to each of the objects in order from 1. Each of Object #1 to Object #5 is a moving object, while Object #6 to Object #8 are stationary objects. Also, in the example of FIG. 3, the image of the video content is partitioned into 5 (vertical)×7 (horizontal) tiles.

In this case, as illustrated in FIG. 3, if a display area 51 made up of 2 (vertical)×3 (horizontal) tiles is specified by the user, only Object #1, Object #2, and Object #6 are included in the display area 51. Consequently, the video playback terminal 14 acquires from the web server 12 and plays back only the audio files of Object #1, Object #2, and Object #6, for example.

As described below, the objects inside the display area 51 may be specified based on the frame size information and the object position information.

(Description of Object Position Information)

Figure 4:
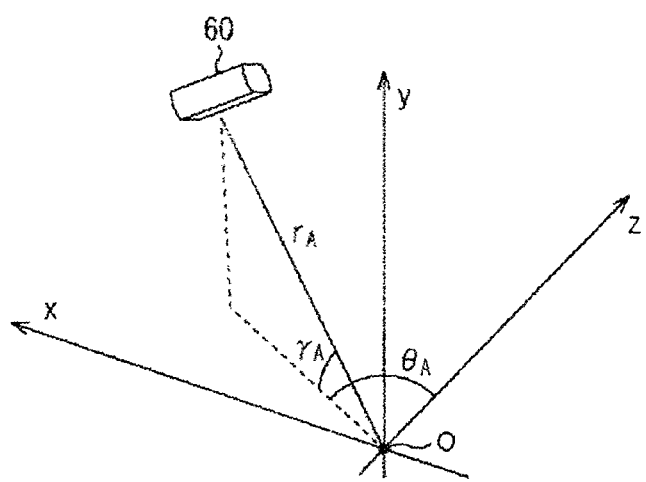
FIG. 4 is a diagram explaining object position information.

FIG. 4 is a diagram explaining object position information.

As illustrated in FIG. 4, the object position information is made up of a horizontal angle $\theta A$ ($-180° \leq \theta A \leq 180°$), a vertical angle $\gamma A$ ($-90° \leq \gamma A \leq 90°$), and a distance $rA$ ($0<rA$) of an object 60. Provided that the photographic position in the center of the image is the origin (reference point) O, the horizontal direction of the image is the X direction, the vertical direction is the Y direction, and the depth direction perpendicular to the XY plane is the Z direction, the horizontal angle $\theta A$ is the angle in the horizontal direction between a line joining the object 60 and the origin O, and the YZ plane. The vertical angle $\gamma A$ is the angle in the vertical direction between a line joining the object 60 and the origin O, and the XZ plane. The distance $rA$ is the distance between the object 60 and the origin O.

Note that in this specification, angles of leftward rotation and upward rotation are treated as positive angles, while angles of rightward rotation and downward rotation are treated as negative angles.

(Description of Frame Size Information)

Figure 5:
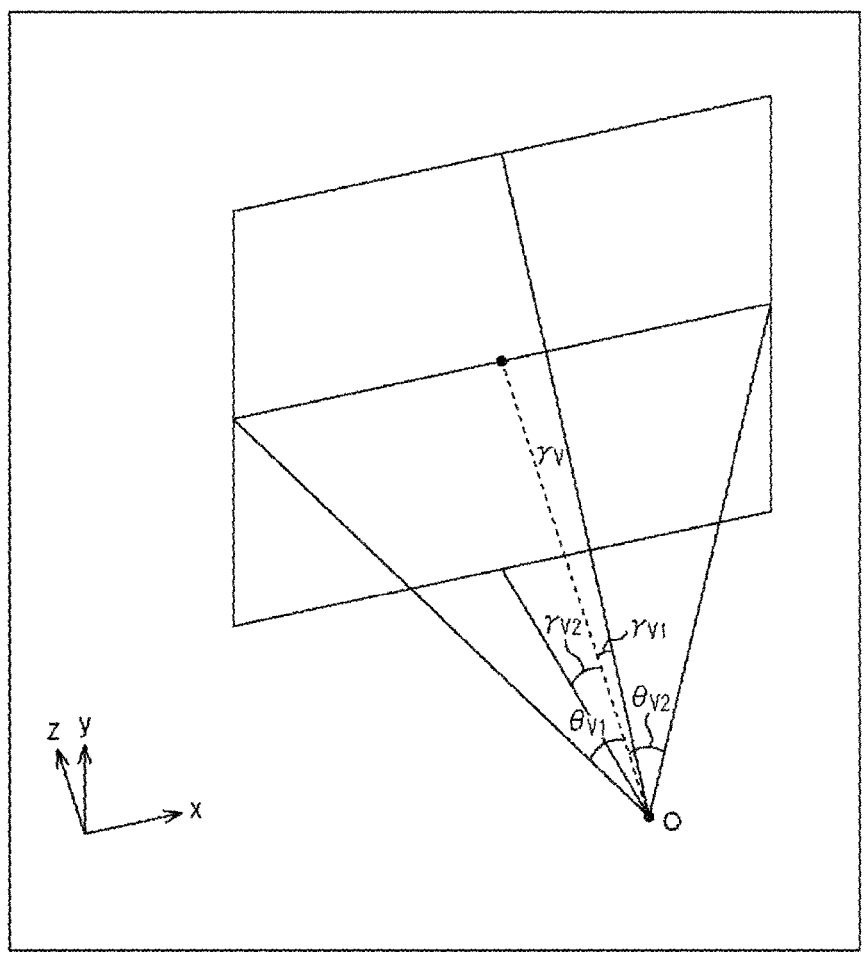
FIG. 5 is a diagram explaining frame size information.

FIG. 5 is a diagram explaining frame size information.

As illustrated in FIG. 5, the frame size information is made up of a horizontal angle $\theta v1$ on the left edge and a horizontal angle $\theta v2$ on the right edge of the frame, a vertical angle $\gamma v1$ on the top edge and a vertical angle $\gamma v2$ on the bottom edge of the frame, and a distance $rv$.

Provided that the photographic position in the center of the image is the origin O, the horizontal direction of the image is the X direction, the vertical direction is the Y direction, and the depth direction perpendicular to the XY plane is the Z direction, the horizontal angle v 1 is the angle in the horizontal direction between a line joining the left edge of the frame and the origin O, and the YZ plane. The horizontal angle $\theta v2$ is the angle in the horizontal direction between a line joining the right edge of the frame and the origin O, and the YZ plane.

Consequently, the combined angle of the horizontal angle $\theta v1$ and the horizontal angle $\theta v2$ is the angle of view in the horizontal direction.

The vertical angles $\gamma V1$ and $\gamma v2$ are the angles between a line joining the top edge or bottom edge of the frame and the origin O, and the XZ plane, respectively. The combined angle of the vertical angle $\gamma V1$ and the vertical angle $\gamma v2$ is the angle of view in the vertical direction. The distance $rv$ is the distance between the origin O and the plane of the image.

As above, the object position information and the frame size information expresses the positional relationship between the object 60 or the frame, and the origin O, respectively. Consequently, based on the object position information and the frame size information, the position, in the image, of each object may be detected (recognized). As a result, objects inside the display area 51 may be specified.

(Overview of MPEG-DASH)

In MPEG-DASH, information for acquiring a segment of arbitrary time is stated in the Media Presentation Description (MPD). Also, in order to acquire data of arbitrary time within a segment file, access information of a subsegment within the segment is stated in the segment index box (sidx) at the beginning of the segment file. Furthermore, in order to acquire only arbitrary I/P pictures for the purpose of trick play and the like, information about the dependence levels (levels) of IPB pictures and their size information are stated in the subsegment index box (ssix) following the sidx at the beginning of the segment file.

The sidx and the ssix are general-purpose access information that do not require interpretation of the MP4 (moof) structure, and may also be utilized as access information for a stream such as an MPEG-2 TS.

(Exemplary Configuration of MP4 File Conforming to MPEG-DASH)

Figure 6:
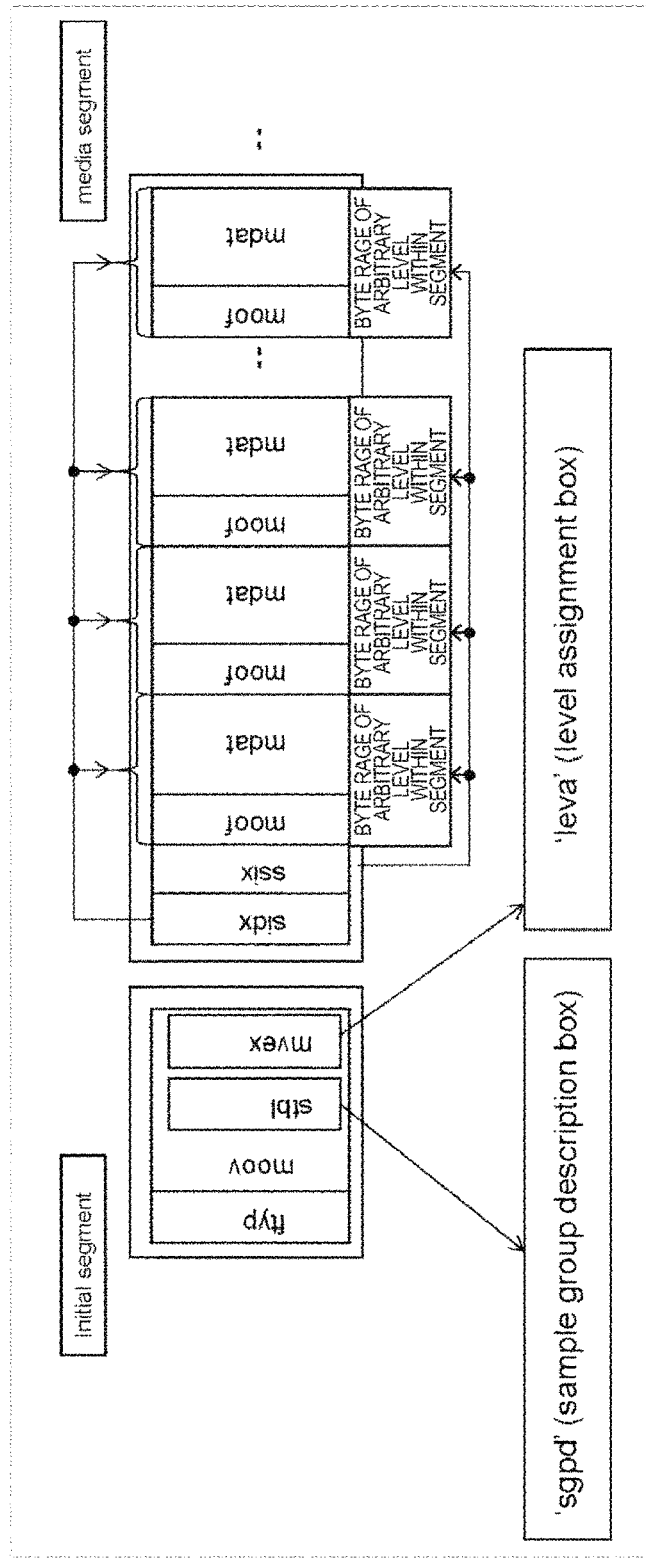
FIG. 6 is a diagram illustrating an exemplary configuration of an MP4 file conforming to MPEG-DASH.

FIG. 6 is a diagram illustrating an exemplary configuration of an MP4 file conforming to MPEG-DASH, including the sidx and the ssix.

In the example of FIG. 6, the MP4 file conforming to MPEG-DASH is made up of an initial segment file in which coding initialization information is stored, and multiple media segment files in which samples are stored.

The initial segment file is made up of an ftyp, and a moov including a sample table box (stbl) and an mvex.

In the stbl of the initial segment file, the type of a byte range indicated by the ssix may be defined in a sample group description box (sgpd). In the mvex, the type defined by the sgpd may be mapped to a level in a level assignment box (leva). Additionally, the respective entries in the sgpd and the leva are linked in index order, and by using these, levels, which are one piece of information stored in the ssix, may be defined.

A media segment (hereinafter also simply called a segment) file includes multiple moofs and mdats in which pictures are stored. Before the beginning of the moof, or in other words, at the beginning of the segment file, the styp, sidx, and ssix are disposed. Herein, the multiple moofs and mdats included in a segment file will be called subsegments.

In the sidx and the ssix, access information for accessing the subsegments constituting the segment file acquired from MPD information (time, URL) are stored.

In the sidx, a table of the size (referenced_size) of the subsegments (moof+mdat) is stored. Consequently, from the sidx information, it is possible to acquire only the subsegment of an arbitrary time, or in other words, random access is possible.

In the ssix, the byte range is stored using the level value mapped in the leva. Consequently, from the ssix information, it is possible to access the byte range of an arbitrary level within a subsegment.

(Support for HEVC Tile Structure and 3D Audio)

At this point, in coding according to the HEVC standard, a tile structure that partitions an image into multiple tiles as discussed earlier with reference to FIG. 2 may be used to enable an application to decode only the region (tile) requiring decoding.

On the other hand, in MP4, the definition of a subsample is decided for each codec. For example, when one picture is made up of multiple tiles in HEVC, the tiles are managed as subsamples constituting a sample in the MP4 file.

FIG. 7 illustrates an example of a subsample information box.

The subsample information box includes only the sizes inside a sample (subsamples). Regarding what the subsamples are, there is a definition flag field on the second line from the top, and by setting a definition flag there, what the subsamples are may be understood. In the example of FIG. 7, a definition flag of 0 according to HEVC is set, which indicates subsamples at the NAL boundary, as illustrated in FIG. 8. Note that in the case of tiles, as illustrated in FIG. 8, setting a definition flag of 2 according to HEVC in the definition flag field indicates tile subsamples.

FIG. 8 is a diagram illustrating an example of definitions of HEVC subsamples.

For the use of the sub-sample information box (8.7.7 of ISO/IEC14496-12) in an HEVC stream, a sub-sample is defined on the basis of the value of the flags field of the sub-sample information box as specified below. The presence of this box is optional; however, if present in a track containing HEVC data, it shall have the semantics defined here.

flags specifies the type of sub-sample information given in this box as follows:

0: NAL-unit-based sub-samples. A sub-sample contains one or more contiguous NAL units.
1: Decoding-unit-based sub-samples. A sub-sample contains exactly one decoding unit.
2: Tile-based sub-samples. A sub-sample either contains one tile and the associated non-VCL NAL units, if any, of the VCL NAL unit(s) containing the tile, or contains one or more non-VCL NAL units.
3: CTU-row-based sub-samples. A sub-sample either contains one CTU row within a slice and the associated non-VCL NAL units, if any, of the VCL NAL unit(s) containing the CTU row or contains one or more non-VCL NAL units. This type of sub-sample information shall not be used when entropy_coding_sync_enabled_flag is equal to 0.
4: Slice-based sub-samples. A sub-sample either contains one slice (where each slice may contain one or more slice segments, each of which is a NAL unit) and the associated non-VCL NAL units, if any, or contains one or more non-VCL NAL units.

As above, in the HEVC file format, there are subsample definition flags for individually defining subsamples in HEVC. Similarly, in the present technology, subsample definition flags are provided likewise for individually defining subsamples in 3D audio.

FIG. 9 is a diagram illustrating an example of definitions of 3D audio subsamples.

For the use of the sub-sample information box (8.7.7 of ISO/IEC14496-12) in an 3D audio stream, a sub-sample is defined on the basis of the value of the flags field of the sub-sample information box as specified below. The presence of this box is optional; however, if present in a track containing 3D audio data, it shall have the semantics defined here.

flags specifies the type of sub-sample information given in this box as follows:
0: channel audio decoding frame sub-sample
1: HOA audio decoding frame sub-sample
2: Object-based sub-samples.
3: 3d audio metadata sub-sample For 3D audio, a definition flag of 0 indicates a subsample of channel audio. A definition flag of 1 indicates a subsample of audio recorded using a spherical microphone. A definition flag of 2 indicates a subsample of object audio. A definition flag of 3 indicates a subsample of 3d audio metadata.

Additionally, in order to acquire only arbitrary subsamples (tiles) constituting a sample from the MP4 file, a process of first acquiring the moof, acquiring the subsample information box within the moof, and then acquiring the subsamples is necessary. In other words, there is a large amount of processing before acquiring the actual data, such as having to deliberately analyze the moof, and data acquisition is inefficient.

Meanwhile, in an MP4 file conforming to MPEG-DASH, as discussed earlier, the sidx and the ssix are general-purpose access information that do not require interpretation of the MP4 (moof) structure, and may also be utilized as access information for a stream such as an MPEG-2 TS.

However, since only I/B/P access information in units of pictures may be stated in the ssix, ultimately, interpretation of the MP4 (moof) structure is required, and thus the amount of processing in order to acquire the actual data is large.

Furthermore, when a segment is made up of multiple moofs/mdats, since the subsample information box is stored within each moof, the amount of processing in order to acquire the actual data becomes even larger.

Note that for standardization, extensions beyond the sidx/ssix are not desirable. Instead, it is desirable to utilize the existing structure as much as possible.

On the other hand, as discussed above with reference to FIGS. 3 to 5, 3D audio is a standard by which the audio of multiple objects acting as sounds in an image may be coded as parts of respectively independent streams. Consequently, with 3D audio, it is anticipated that there will be demand to access only one certain object, as with HEVC tiles discussed above.

(Description of Present Technology)

Accordingly, in the present technology, subsample definition flags being used to individually define properties such as the codec are utilized to define new, general-purpose sample groups, thereby making it possible to map the subsamples of all codecs to levels with the existing sgpd and ssix. Consequently, it becomes possible to efficiently access arbitrary subsamples within a sample.

Note that although the following describes an example in which the subsamples are tiles or 3D audio, the present technology is not limited to subsamples and tiles or 3D audio, and provides an expanded definition of a general-purpose mechanism enabling the statement of some element constituting a sample. Additionally, in this specification, information for accessing subsamples, such as the sgpd, the leva, and the ssix, will be referred to collectively as subsample access information.

FIG. 10 is a diagram illustrating an example of a definition of a subsample sample group of the present technology. In other words, in the example of FIG. 10, a sample group of subsamples is defined.

A subsample sample group extends VisualSampleGroupEntry with grouping_type='sgss'. The syntax of a subsample sample group is made up of codec_parameter, sub_sample_flags, and reserved (a reserved area).

codec_parameter is identification information expressing information about the codec, while Flags are the definition flags that define the subsamples for each codec (the subsample definition flags discussed earlier). Note that the definition flags may also be considered to be flags that identify subsamples.

Figure 11:
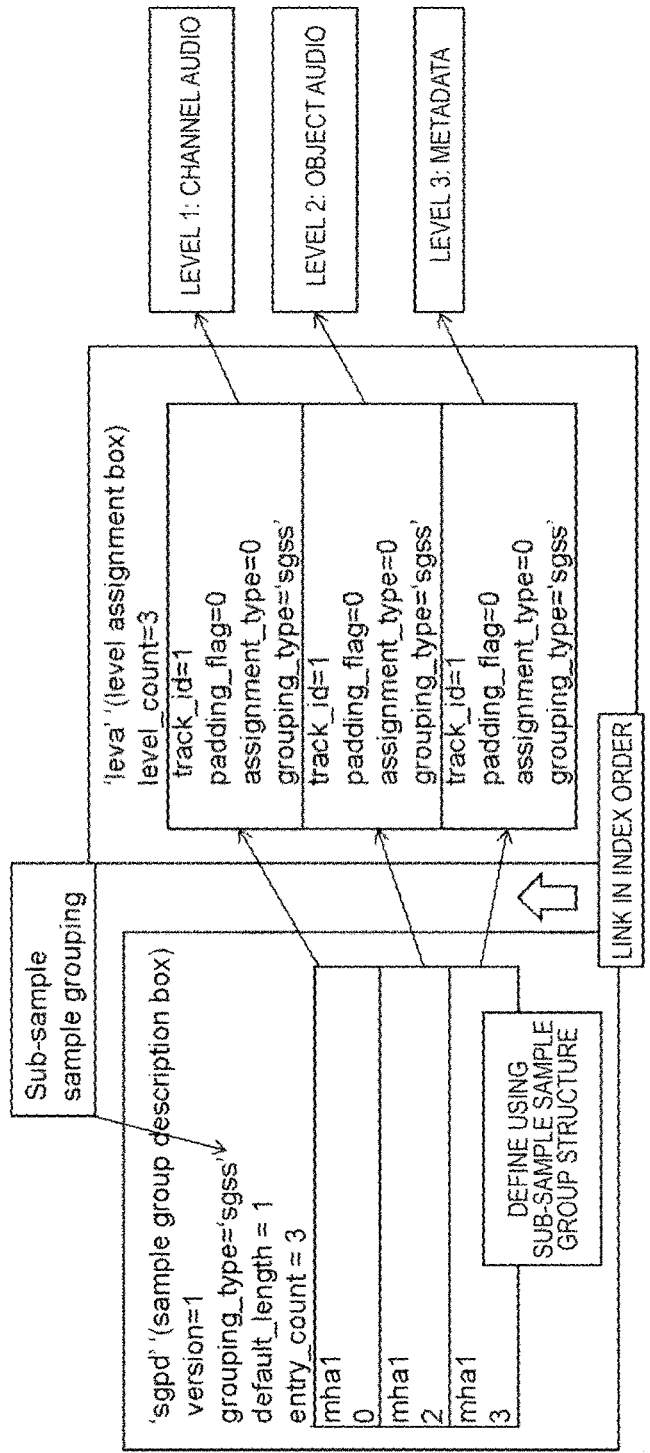
FIG. 11 illustrates an example of mapping 3d audio subsamples to levels.

Next, FIG. 11 will be referenced to describe an example of mapping 3d audio subsamples to levels. In other words, in the example of FIG. 11, an example of mapping the definitions in FIG. 10 to levels using the sample group description box (sgpd) and the level assignment box (leva) is illustrated.

As indicated by grouping_type='sgss', the subsample sample group (entry) structure in FIG. 10 is used as the sample group description box (sgpd). mha1 is identification information indicating 3d audio. As indicated by entry_count=3, three entries are included in the sgpd. The three entries are defined to be mha1 0, mha1 1, and mha1 2. mha1 0 (a definition flag) indicates channel audio of 3d audio. mha1 2 (a definition flag) indicates object audio of 3d audio. mha1 3 (a definition flag) indicates metadata of 3d audio.

To assign these meanings of the sample group description box (sgpd) to levels, entries in the sample group description box (sgpd) are linked to entries in the level assignment box (leva) in index order. Since the tracks are the same, the leva entries all have track_id=1, padding_flag=0, assignment_type=0, and grouping_type='sgss'.

In other words, what can be read from the leva entries in FIG. 11 is the information that Level1 is channel audio, Lavel2 is object audio, and Lavel3 is metadata.

Figure 12:
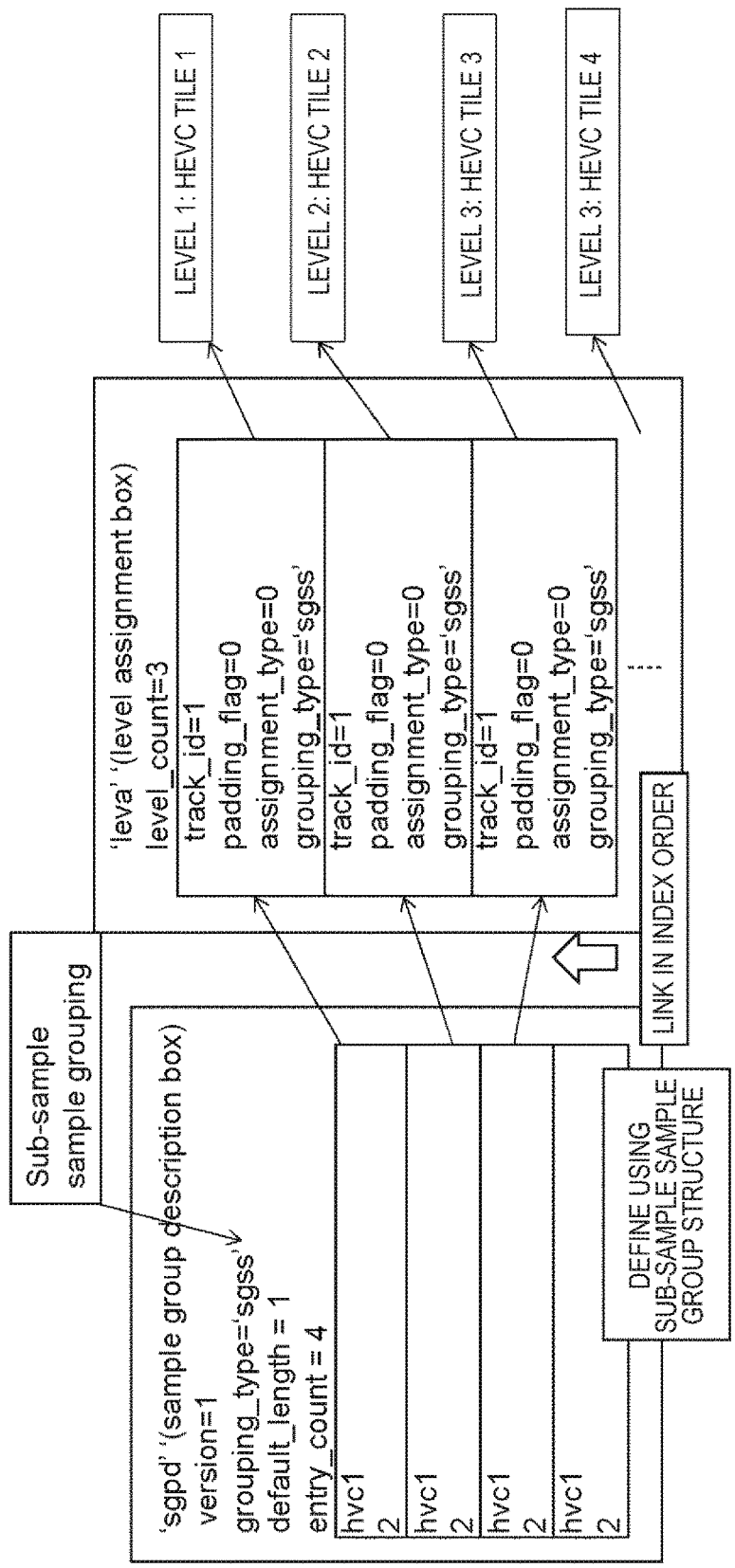
FIG. 12 is a diagram illustrating an example of mapping HEVC tile subsamples to levels.

Next, FIG. 12 will be referenced to describe an example of mapping HEVC tile subsamples to levels. In other words, in the example of FIG. 12, an example of mapping the definitions in FIG. 10 to levels using the sample group description box (sgpd) and the level assignment box (leva) is illustrated.

As indicated by grouping_type='sgss', the subsample sample group (entry) structure in FIG. 10 is used as the sample group description box (sgpd). hvc1 is identification information indicating 3d audio. For the tiles, an image is made up of four tiles as discussed earlier with reference to FIG. 2, and as indicated by entry_count=4, four entries are included in the sgpd. The four entries are all defined to be hvc1 2. hvc1 2 (a definition flag) indicates 3 HEVC tiles.

To assign these meanings of the sample group description box (sgpd) to levels, entries in the sample group description box (sgpd) are linked to entries in the level assignment box (leva) in index order. Since the tracks are the same, the leva entries all have track_id=1, padding_flag=0, assignment_type=0, and grouping_type='sgss'.

In other words, what can be read from the leva entries in FIG. 12 is the information that Level1 is HEVC Tile1, Lavel2 is Tile2, Lavel3 is Tile3, and Lavel4 is Tile4.

As above, the subsample definition flags used to individually define properties such as the codec are utilized to define new, general-purpose sample groups. Consequently, as discussed above, it becomes possible to map the subsamples of all codecs to levels with the existing sgpd and ssix. Consequently, it becomes possible to efficiently access arbitrary subsamples within a sample.

However, with the present technology of using the subsample definition flags to map to levels, in the case of HEVC tiles and 3d audio, position information becomes necessary, as discussed above with reference to FIG. 2 and FIGS. 3 to 5, but there is no method of collectively defining multiple subsample groups.

Accordingly, the following Method 1 to Method 3 are proposed as the present technology. Note that although the following described 3d audio as an example, tiles may also be processed similarly.

First, a sample group that stores position information for a 3d audio object is illustrated as in FIG. 13.

The audio object sample group extends the audio sample group with grouping_type='aoif'. The syntax of an audio object sample group is made up of objectTheta, objectGamma, objectLength, maxObjectTheta1, maxObjectTheta2, objectGamma1, objectGamma2, objectLength1, and objectLength2.

According to the semantics, objectTheta is the angle in the horizontal direction indicating the position of the object. objectGamma is the angle in the vertical direction indicating the position of the object. objectLength is the distance indicating the position of the object. maxobjectTheta1 is the leftmost angle in the horizontal direction indicating the position of the object. maxobjectTheta2 is the rightmost angle in the horizontal direction indicating the position of the object. objectGamma1 is the bottommost angle in the vertical direction indicating the position of the object. objectGamma2 is the topmost angle in the vertical direction indicating the position of the object. objectLength1 is the shallowest distance in the depth direction indicating the position of the object. objectLength2 is the deepest distance in the depth direction indicating the position of the object.

Next, Method 1 of grouping multiple sample groups will be described with reference to FIG. 14. In Method 1, reference information to sample groups to be used together is stored in the subsample group.

In the example of FIG. 14, the subsample group extends the visual sample group with grouping_type='sgss'. In the subsample group, in addition to codec_parameter, sub_sample_flas, and reseved, there is stored num_of sample_group (the number of sample groups), sample group entries to be used together (in other words, referenced), and the sample group index.

Figure 15:
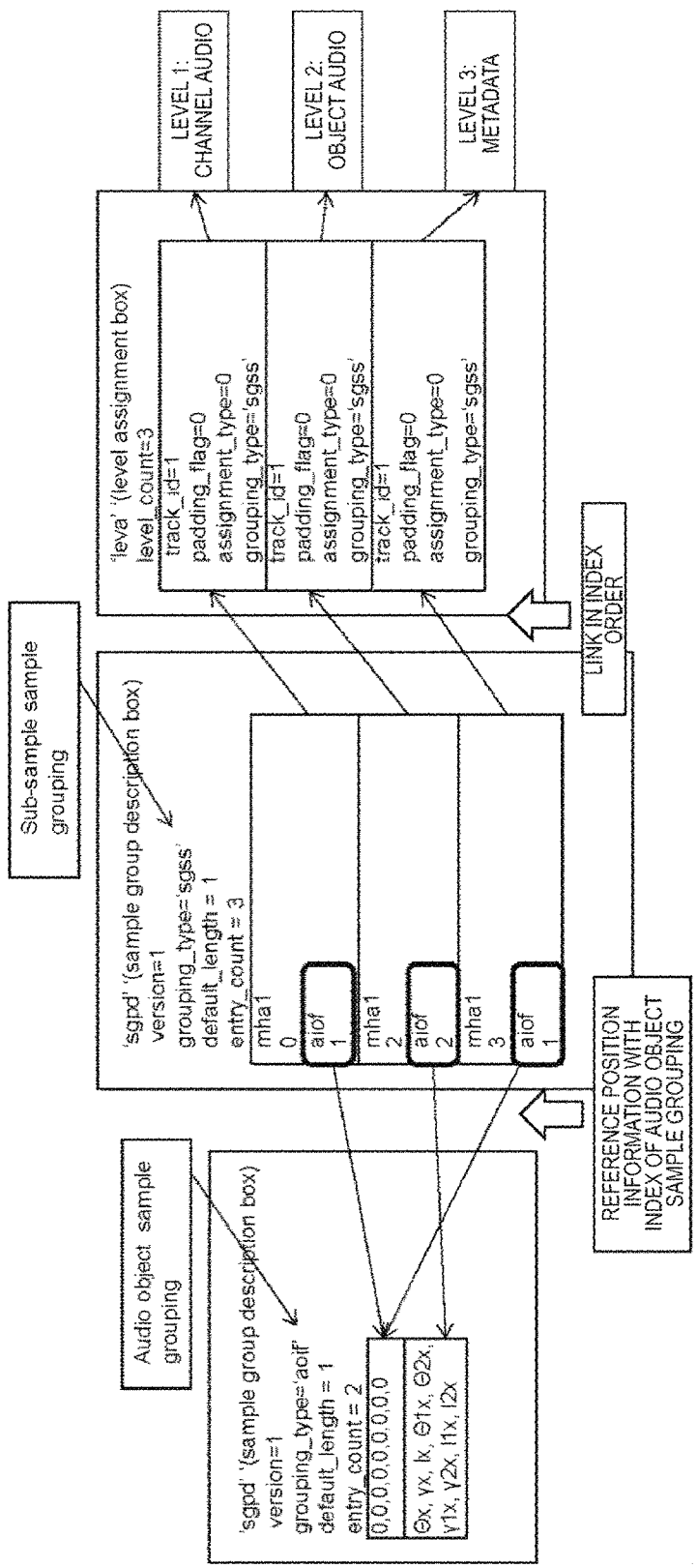
FIG. 15 is a diagram illustrating an example of Method 1 of grouping multiple sample groups.

Specifically, as described from the left side of FIG. 15, as indicated by grouping_type='aoif', the audio object sample group (entry) structure in FIG. 13 is used as the sample group description box (sgpd). mha1 is identification information indicating 3d audio. As indicated by entry_count=2, two entries are included in the sgpd. The two entries are the position information 0, 0, 0, 0, 0, 0, 0, 0 (meaning nul) for the entry of index 1, and the position information $\theta x, \gamma x, lx, \theta 1x, \theta 2x, \gamma 1x, \gamma 2x, l1x, l2x$ for the entry of index 2.

As indicated by grouping_type='sgss', the subsample sample group (entry) structure in FIG. 10 is used as the sample group description box (sgpd) in the center.

mha1 is identification information indicating 3d audio. As indicated by entry_count=3, three entries are included in the sgpd. The entries of index 1 to 3 are defined to be mha1 0 and aiof 1, mha1 2 and aiof 2, mha1 3 and aiof 1, respectively.

mha1 0 (a definition flag) and aiof 1 indicates channel audio of 3d audio, and indicates that index 1 of the audio object sample group in FIG. 13 (the position information 0, 0, 0, 0, 0, 0, 0, 0 (meaning nul)) is referenced.

mha1 2 (a definition flag) indicates object audio of 3d audio, and indicates that index 1 of the audio object sample group in FIG. 13 (the position information $\theta x, \gamma x, lx, \theta 1x, \theta 2x, \gamma 1x, \gamma 2x, l1x, l2x$ for the entry of index 2) is referenced.

mha1 3 (a definition flag) indicates metadata of 3d audio, and indicates that index 1 of the audio object sample group in FIG. 13 (the position information 0, 0, 0, 0, 0, 0, 0, 0 (meaning nul)) is referenced.

To assign these meanings of the sample group description box (sgpd) to levels, entries in the sample group description box (sgpd) are linked to entries in the level assignment box (leva) in index order. Since the tracks are the same, the leva entries all have track_id=1, padding_flag=0, assignment_type=0, and grouping_type='sgss'.

In other words, what can be read from the leva entries in FIG. 15 is the information that Level1 is channel audio, Lavel2 is object audio, and Lavel3 is metadata.

By assigning position information as above, in the ssix, the level values mapped in the leva may be used to store byte ranges.

Next, Method 2 of grouping multiple sample groups will be described with reference to FIG. 16. In Method 2, a sample group bundling multiple subsample groups is defined.

In the example of FIG. 16, the subsample group set extends the visual sample group with grouping_type='sgsg' (a sample group set grouping multiple sample groups). In the subsample group set, sample group entries referencing the sample group set and the sample group index are stored.

Specifically, as described from the left side of FIG. 17A and FIG. 17B, as indicated by grouping_type='aoif', the audio object sample group (entry) structure in FIG. 13 is used as the sample group description box (sgpd). As indicated by entry_count=2, two entries are included in the sgpd. The two entries are the position information 0, 0, 0, 0, 0, 0, 0, 0 (null) for the entry of index 1, and the position information θx, γx, lx, θ1x, θ2x, γ1x, γ2x, l1x, l2x for the entry of index 2.

Additionally, as indicated by grouping_type='sgss', the subsample sample group (entry) structure in FIG. 10 is used as the sample group description box (sgpd) on the right side.

mha1 is identification information indicating 3d audio. As indicated by entry_count=3, three entries are included in the sgpd. The entries of index 1 to 3 are defined to be mha1 0, mha1 2, and mha1 3.

Figure 18:
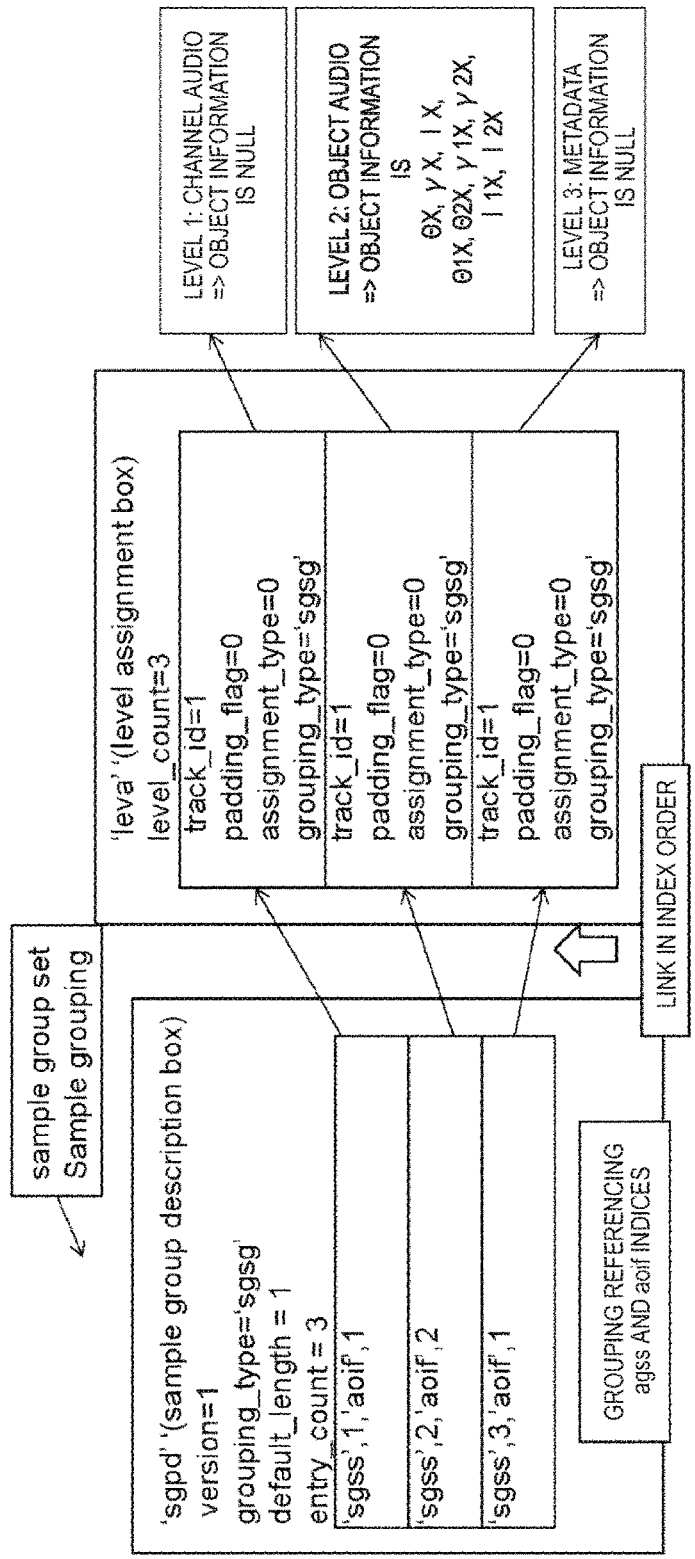
FIG. 18 is a diagram illustrating an example of Method 2 of grouping multiple sample groups.

These two sample groups are grouped as a sample group set, as illustrated on the left side of FIG. 18, and are assigned to levels, as illustrated on the right side of FIG. 18.

Specifically, as indicated by grouping_type='sgsg', the subsample group set (entry) structure in FIG. 16 is used as the sample group description box (sgpd). As indicated by entry_count=3, three entries are included in the sgpd. The three entries are 'sgsg', 1 and "aoif", 1 for the entry of index 1, 'sgsg', 2 and 'aoif', 2 for the entry of index 2, and 'sgsg', 3 and 'aoif', 1 for the entry of index 3.

To assign these meanings of the sample group description box (sgpd) to levels, entries in the sample group description box (sgpd) are linked to entries in the level assignment box (leva) in index order. Since the tracks are the same, the leva entries all have track_id=1, padding_flag=0, assignment_type=0, and grouping_type='sgsg'.

In other words, what can be read from the leva entries in FIG. 18 is the information that Level1 is channel audio and the object information is null, Lavel2 is object audio and the object information is θx, γx, lx, θ1x, θ2x, γ1x, γ2x, l1x, l2x, and Lavel3 is metadata and the object information is null.

As above, for example, since two sample groups are grouped together as a sample group set, in the ssix, the level values mapped in the leva may be used to store byte ranges.

Next, Method 3 of grouping multiple sample groups will be described with reference to FIG. 19. In Method 3, multiple level assignments are defined for sample groups set to the same level. In other words, in Method 3, in addition to the leva/aoif level assignments of FIG. 11, the leva/sgss level assignments of FIG. 19 are conducted.

Figure 19:
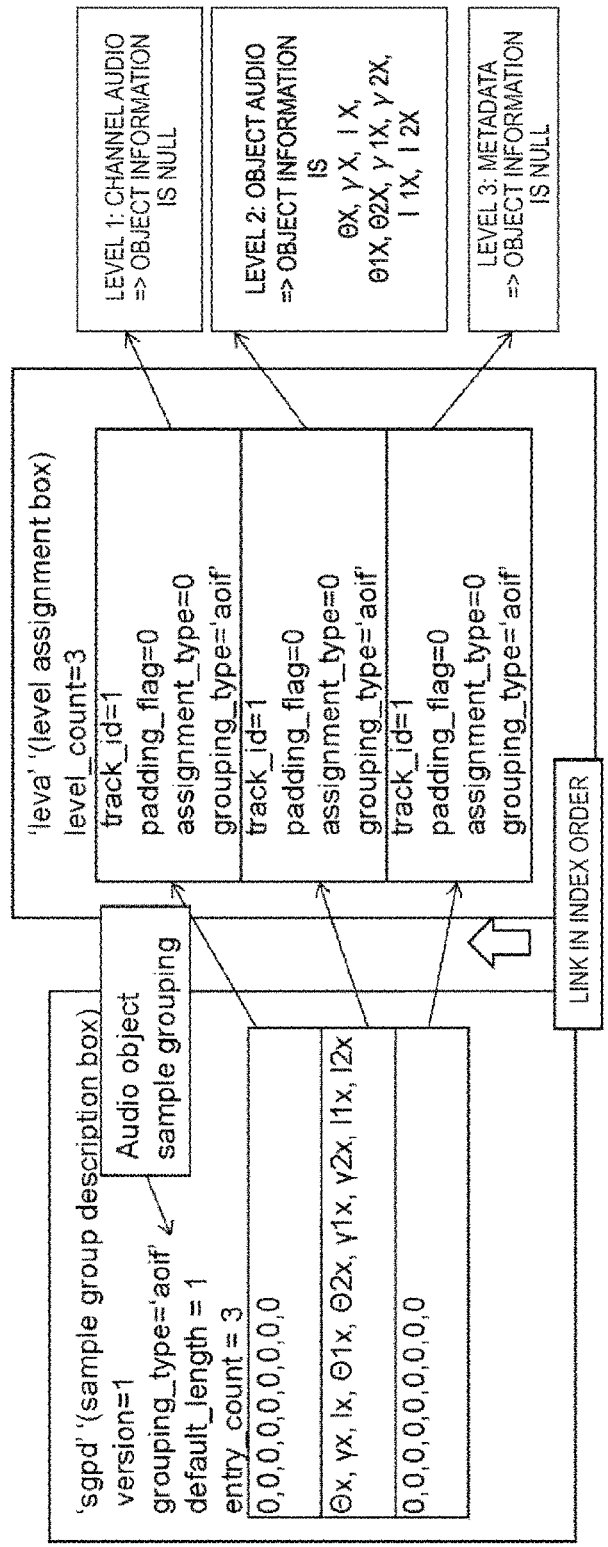
FIG. 19 is a diagram explaining a Method 3 of grouping multiple sample groups.

As described from the left side of FIG. 19, as indicated by grouping_type='aoif', the audio object sample group (entry) structure in FIG. 13 is used as the sample group description box (sgpd). As indicated by entry_count=3, three entries are included in the sgpd. The three entries are the position information 0, 0, 0, 0, 0, 0, 0, 0 (null) for the entry of index 1, the position information θx, γx, lx, θ1x, θ2x, γ1x, γ2x, l1x, l2x for the entry of index 2, and the position information 0, 0, 0, 0, 0, 0, 0, 0 (null) for the entry of index 3.

To assign these meanings of the sample group description box (sgpd) to levels, entries in the sample group description box (sgpd) are linked to entries in the level assignment box (leva) in index order. Since the tracks are the same, the leva entries all have track_id=1, padding_flag=0, assignment_type=0, and grouping_type='aoif'.

In other words, what can be read from the leva entries in FIG. 19 is the information that Level1 is channel audio and the object information is null, Lavel2 is object audio and the object information is θx, γx, lx, θ1x, θ2x, γ1x, γ2x, l1x, l2x, and Lavel3 is metadata and the object information is null.

Additionally, in Method 3, the target object audio level is analyzed from the analysis result read from the leva entries of FIG. 19 and the analysis result read from the leva entries of FIG. 11 as above.

As described above, there are three varieties of grouping multiple sample groups, and their strengths and weaknesses are summarized in FIG. 20.

FIG. 20 is a diagram illustrating a comparison of Methods 1 to 3 of grouping multiple sample groups.

A good point of Method 1 is that since only the separately defined sample groups are referenced from the newly defined sgss, the extension comes at no cost. A bad point of Method 1 is that since the extension has no versatility, it will be necessary to cope with similar requisites individually.

A good point of Method 2 is that since a sample group grouping multiple sample groups is defined, the method is highly versatile, and may be realized in any combination. A bad point of Method 2 is that a new extension for grouping sample groups becomes necessary.

A good point of Method 3 is that since levels are simply set in the level assignment box for each sample group, additional definitions are unnecessary, and the method is able to accommodate additional operating stipulations. A bad point of Method 3 is that a number of level assignment boxes equal to the number of groups of sample groups becomes necessary, and the data structure inside files becomes verbose.

As above, with the present technology, the subsample definition flags used to individually define properties such as the codec are utilized to define new, general-purpose sample groups.

Additionally, multiple sample groups are made to be grouped together.

According to the above, it becomes possible to map the subsamples of all codecs to levels with the existing sgpd and ssix. Consequently, it becomes possible to efficiently access arbitrary subsamples within a sample.

Furthermore, access according to data type within a segment may be realized for data other than 3d audio, and even for information other than tiles.

Next, a specific example of the technology discussed above will be described hereinafter, taking the information processing system in FIG. 1 as an example.

(Exemplary Configuration of File Generation Device)

Figure 21:
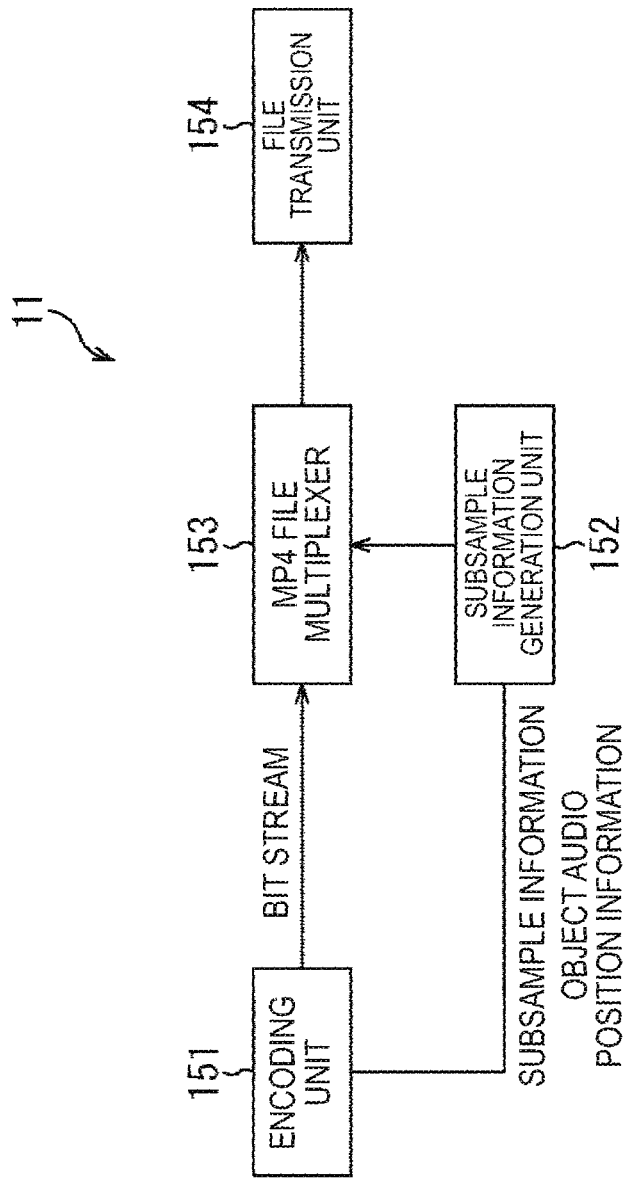
FIG. 21 is a block diagram illustrating an example configuration of a file generation device 11.

FIG. 21 is a block diagram illustrating an exemplary configuration of the file generation device 11 shown in FIG. 1.

In the example of FIG. 21, the file generation device 11 encodes content data, and generates multiple MP4 files of the same content at different bit rates, as well as the MPD file discussed earlier. The file generation device 11 includes an encoding unit 151, a subsample information generation unit 152, an MP4 file multiplexer 153, and a file transmission unit 154.

The encoding unit 151 encodes content data with HEVC or the like, for example, to generate a bit stream, and supplies the generated bit stream to the MP4 file multiplexer 153. Also, the encoding unit 151 supplies object audio position information and subsample information to the subsample information generation unit 152. Note that during encoding, the encoding unit 151 encodes by partitioning pictures into multiple tiles, and in the case of tiles, information related to the tiles, such as tile position information, is also supplied to the subsample information generation unit 152.

The subsample information generation unit 152 generates sample group information based on the audio object position information from the encoding unit 151. At this point, level information is also generated. Additionally, the subsample information generation unit 152 generates ssis information of the subsample information included in the moof of the MP4 files conforming to MPEG-DASH, based on the generated sample group information. The subsample information generation unit 152 supplies the generated sample group information of the audio object position information, the level information, and the ssix information of the subsample information to the MP4 file multiplexer 153.

The MP4 file multiplexer 153 generates MP4 files conforming to MPEG-DASH from the bit stream from the encoding unit 151, and multiplexes the sample group information of the audio object position information, the level information, and the ssix information of the subsample information from the subsample information generation unit 152. In other words, there are generated MP4 files in which the subsample information and the gsix information are multiplexed. Note that, specifically, the subsample information is stored in the subsample information box within the moof.

The MP4 files multiplexed and generated by the MP4 file multiplexer 153 are supplied to the file transmission unit 154. The file transmission unit 154 transmits the MP4 files to the web server 12 for storage in a storage unit not illustrated.

Note that, although not illustrated in the example of FIG. 10, in actual practice, the file generation device 11 is also made up of an MPD file generation unit, by which an MPD file is generated. Subsequently, the generated MPD file is stored in a storage unit (not illustrated) of the web server 12 by the file transmission unit 154.

(File Generation Process)

Figure 22:
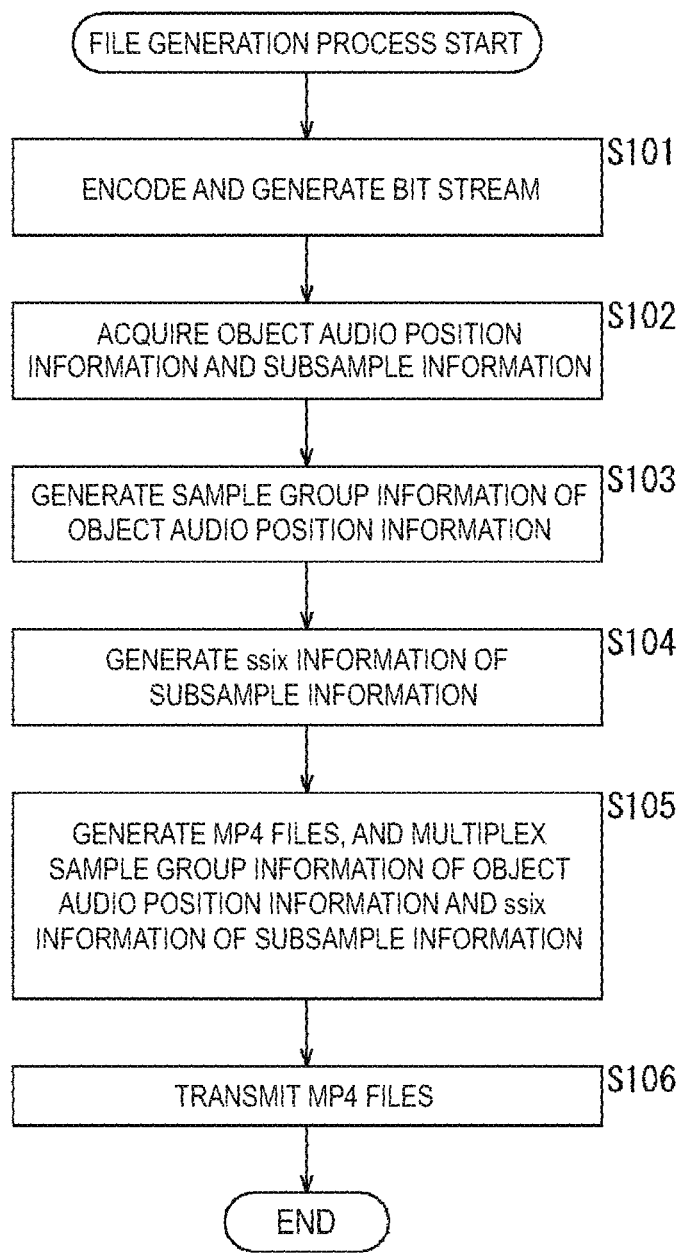
FIG. 22 is a flowchart explaining a file generation process.

Next, a file generation process by the file generation device 11 will be described with reference to the flowchart in FIG. 22.

In step S101, the encoding unit 151 encodes content data with HEVC or the like, for example, and generates a bit stream. The encoding unit 151 supplies the generated bit stream to the MP4 file multiplexer 153.

The encoding unit 151 supplies object audio position information and subsample information to the subsample information generation unit 152.

Correspondingly, in step S102, the subsample information generation unit 152 acquires the object audio position information and the subsample information.

In step S103, the subsample information generation unit 152 generates sample group information of object audio position information, based on the audio object position information. In other words, in step S103, subsample access information, such as the aoif, leva, sgss, and sgsg, are generated according to Method 1 to Method 3 discussed earlier with reference to FIG. 14 to FIG. 19.

In step S104, the subsample information generation unit 152 generates the ssix of the subsample information. The subsample information generation unit 152 supplies the generated sample group information of the audio object position information, the level information, and the ssix information of the subsample information to the MP4 file multiplexer 153.

In step S105, the MP4 file multiplexer 153 generates MP4 files conforming to MPEG-DASH from the HEVC bit stream from the encoding unit 151, and multiplexes the sample group information of the audio object position information, the level information, and the ssix information of the subsample information from the subsample information generation unit 152. In other words, there are generated MP4 files in which the sample group information of the audio object position information, the level information, and the ssix information of the subsample information are multiplexed. Note that, specifically, the subsample information is stored in the subsample information box in the moof.

The MP4 files multiplexed and generated by the MP4 file multiplexer 153 are supplied to the file transmission unit 154. In step S105, the file transmission unit 154 transmits the MP4 files to the web server 12 for storage in a storage unit not illustrated.

(Example of Object Audio Playback Process)

Figure 23:
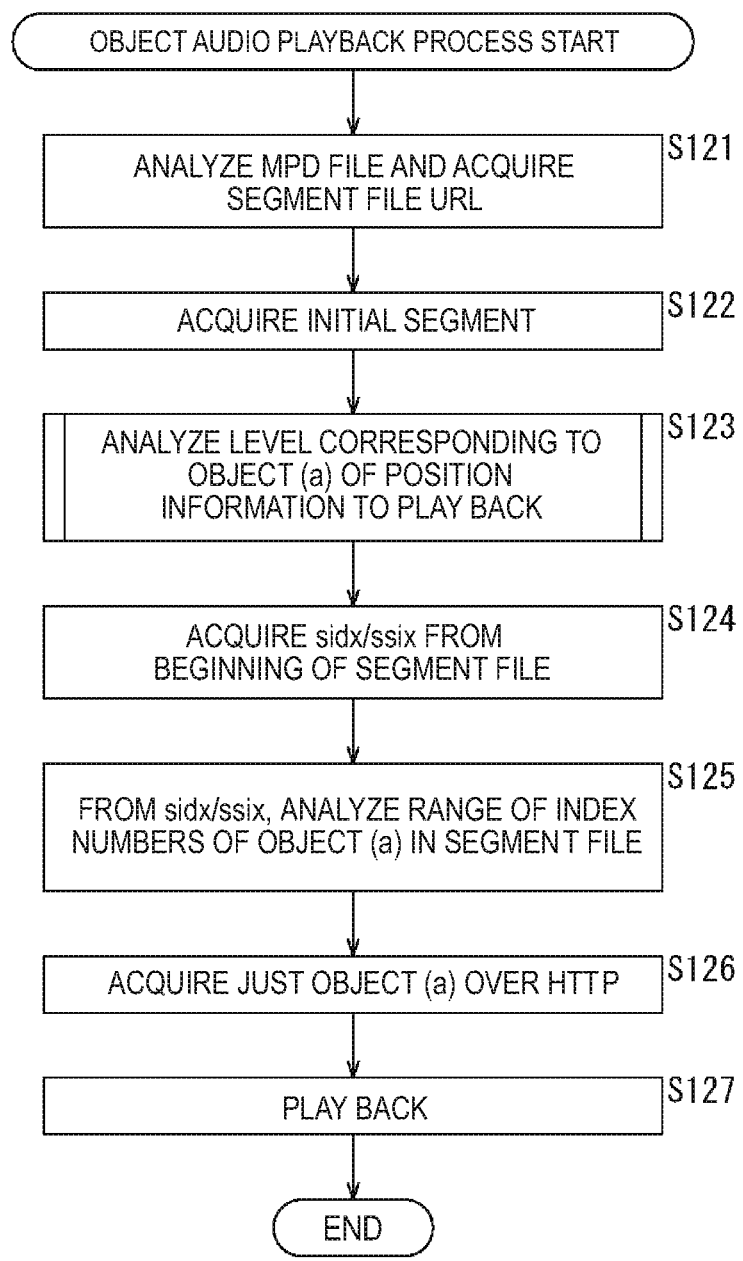
FIG. 23 is a flowchart explaining an example of an object audio playback process.

Next, an object audio playback process by the video playback terminal 14 will be described with reference to the flowchart in FIG. 23.

In step S121, the streaming control unit 21 analyzes the MPD file in the storage unit (not illustrated) of the web server 12, and acquires the URL (access) information of a segment file to acquire. In other words, the streaming control unit 21 selects the optimal image size, tiles, and coding rate in consideration of the screen size and the state of the transmission pathway on the basis of the analyzed MPD file, and thereby acquires the URL (access) information of the segment files to acquire. The access information is supplied to the HTTP access unit 23.

In step S122, the HTTP access unit 23 uses access information from the streaming control unit 21 to acquire the initial segment of an MP4 file at the desired coding rate.

In step S123, the streaming control unit 21 analyzes the level corresponding to an object (a) of the position information to play back. This level analysis process will be discussed later with reference to FIG. 24 to FIG. 26. In step S124, the HTTP access unit 23 acquires the sidx/ssix from the beginning of the segment file.

In step S125, the streaming control unit 21 analyzes the range of index numbers of the object (a) within the segment file from the sidx/gsix acquired by the HTTP access unit 23, based on the level analyzed in step S123.

In step S126, the HTTP access unit 23 acquires only the object (a) from the web server 12 over HTTP. In other words, the HTTP access unit 23 acquires only the object (a) from the web server 12 over HTTP, based on the range of index numbers of the object (a) within the segment file analyzed by the streaming control unit 21.

In step S127, the audio playback unit 31, under control by the streaming control unit 21, plays back the audio data of the object (a) from the HTTP access unit 23. In other words, the audio playback unit 31 performs a decoding process on the audio data of the object (a) from the HTTP access unit 23, and outputs to a speaker not illustrated.

Figure 24:
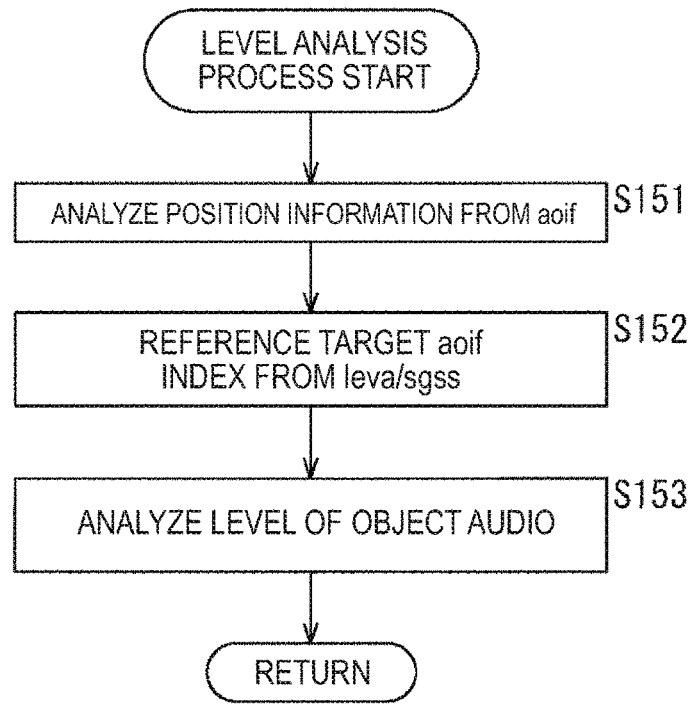
FIG. 24 is a flowchart explaining an example of a level analysis process in the case of Method 1.

Next, an example of the level analysis process in step S123 of FIG. 23 will be described with reference to the flowchart in FIG. 24. In the example of FIG. 24, a level analysis process in the case of Method 1 of grouping multiple sample groups discussed earlier with reference to FIGS. 14 and 15 is illustrated.

In step S151, the streaming control unit 21 analyzes position information from the aoif (the audio object sample group in FIG. 15).

In step S152, the streaming control unit 21 references a target aoif index from the leva (the level assignment box in FIG. 15) and the sgss (the subsample sample group in FIG. 15).

In step S153, the streaming control unit 21 analyzes the level of the object audio.

According to the above, in the case of Method 1 of grouping multiple sample groups, the level is analyzed.

Figure 25:
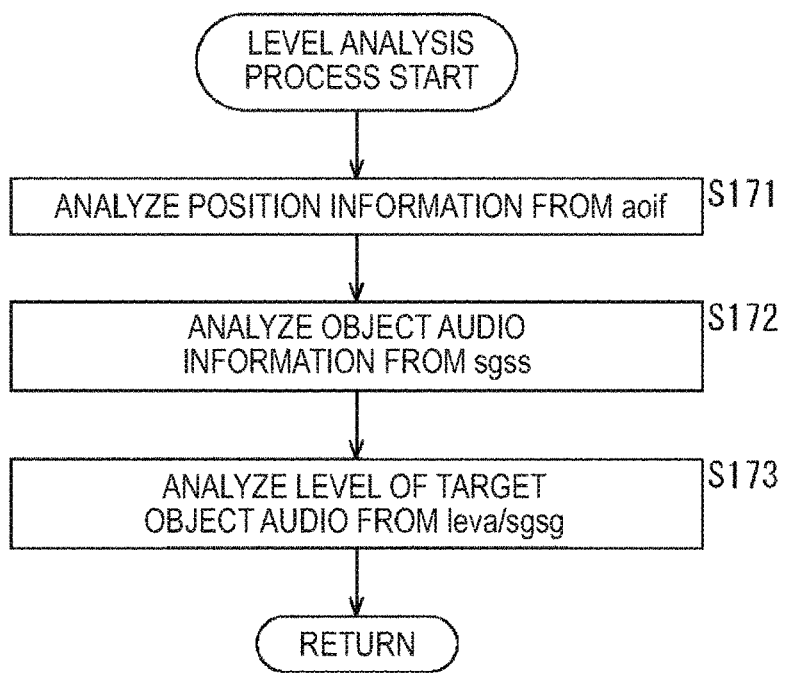
FIG. 25 is a flowchart explaining an example of a level analysis process in the case of Method 2.

Next, an example of the level analysis process in step S123 of FIG. 23 will be described with reference to the flowchart in FIG. 25. In the example of FIG. 25, a level analysis process in the case of Method 2 of grouping multiple sample groups discussed earlier with reference to FIGS. 16 to 18 is illustrated.

In step S171, the streaming control unit 21 analyzes position information from the aoif (the audio object sample group of FIG. 17A).

In step S172, the streaming control unit 21 analyzes object audio information from the sgss (the subsample group of FIG. 17B).

In step S173, the streaming control unit 21 analyzes a target aoif level from the leva (the level assignment box in FIG. 18) and the sgsg (the sample group set in FIG. 18).

According to the above, in the case of Method 2 of grouping multiple sample groups, the level is analyzed.

Figure 26:
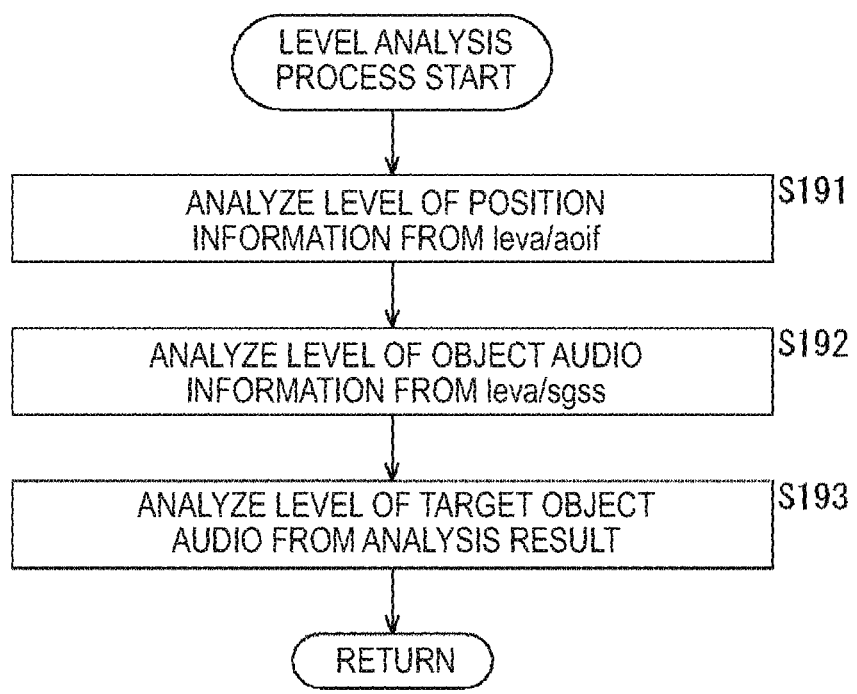
FIG. 26 is a flowchart explaining an example of a level analysis process in the case of Method 3.

Next, an example of the level analysis process in step S123 of FIG. 23 will be described with reference to the flowchart in FIG. 26. In the example of FIG. 26, a level analysis process in the case of Method 3 of grouping multiple sample groups discussed earlier with reference to FIG. 19 is illustrated.

In step S191, the streaming control unit 21 analyzes position information from the leva (the level assignment box in FIG. 19) and the aoif (the audio object sample group in FIG. 19).

In step S192, the streaming control unit 21 analyzes a target level from the leva (the level assignment box in FIG. 11) and the sgss (the subsample group in FIG. 11).

In step S193, the streaming control unit 21 analyzes the level information of the target object audio from the analysis result of step S192.

According to the above, in the case of Method 3 of grouping multiple sample groups, the level is analyzed.

As above, with the present technology, the subsample definition flags used to individually define properties such as the codec are utilized to define new, general-purpose sample groups.

Additionally, multiple sample groups are made to be grouped together.

According to the above, it becomes possible to map the subsamples of all codecs to levels with the existing sgpd and ssix. Consequently, it becomes possible to efficiently access arbitrary subsamples within a sample.

The present technology is applicable to data other than 3d audio, and even to information other than tiles. Consequently, access by data type within a segment may be realized.

Note that although the above description describes an example of converting a bit stream encoded by HEVC into files, the coding method is not limited to HEVC, insofar as the coding method codes multiply partitioned files.

In addition, although the above description describes examples of an MP4 file format, the file format is not limited to an MP4 file format or an AVC file format. Insofar as the problems and advantageous effects according to the present technology are the same, the present technology may also applied similarly to a different file format, a stream used during transmission, and a stream used when storing files.

The series of processes described above can be executed by hardware but can also be executed by software. When the series of processes is executed by software, a program that constructs such software is installed into a computer. Here, the expression "computer" includes a computer in which dedicated hardware is incorporated and a general-purpose personal computer or the like that is capable of executing various functions when various programs are installed.

Figure 27:
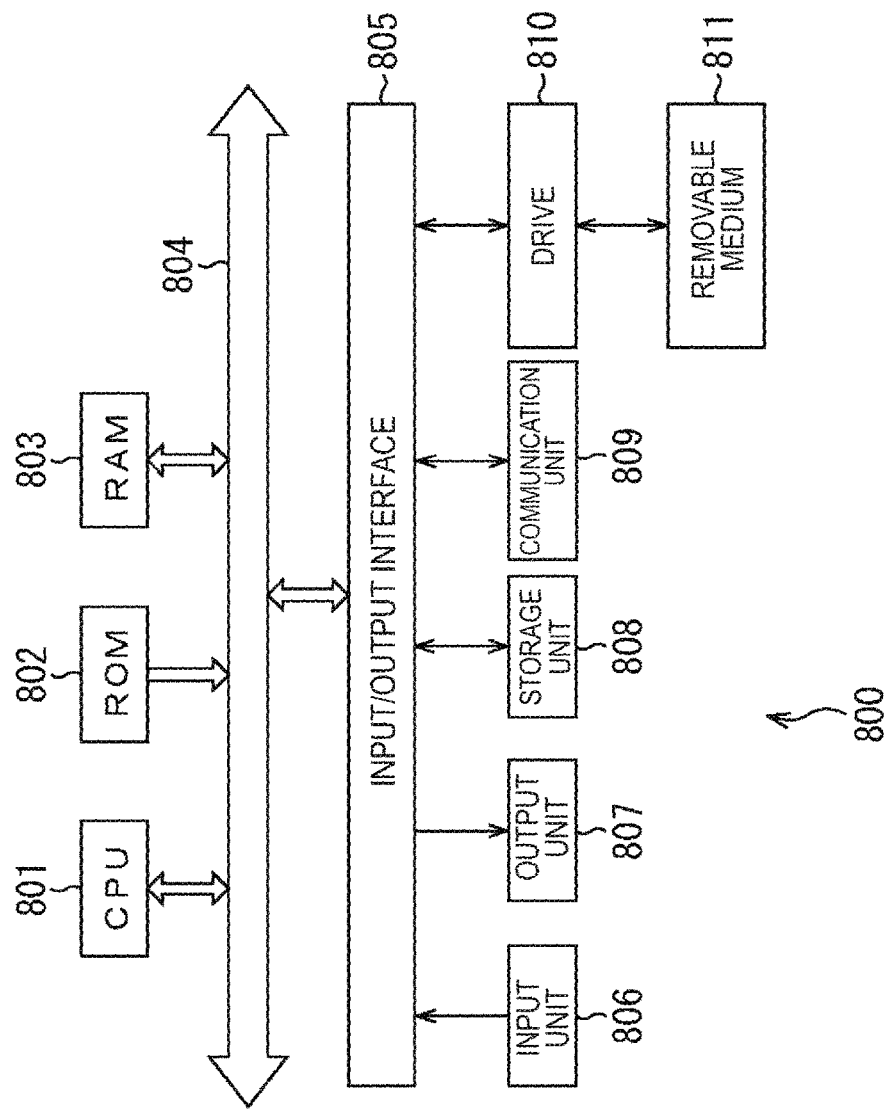
FIG. 27 is a block diagram illustrating an example configuration of a computer.

FIG. 27 is a block diagram showing an example configuration of the hardware of a computer that executes the series of processes described earlier according to a program.

In the computer 800, a central processing unit (CPU) 801, a read only memory (ROM) 802 and a random access memory (RAM) 803 are mutually connected by a bus 804.

An input/output interface 805 is also connected to the bus 804. An input unit 806, an output unit 807, a storage unit 808, a communication unit 809, and a drive 810 are connected to the input/output interface 805.

The input unit 806 is configured from a keyboard, a mouse, a microphone or the like. The output unit 807 configured from a display, a speaker or the like. The storage unit 808 is configured from a hard disk, a non-volatile memory or the like. The communication unit 809 is configured from a network interface or the like. The drive 810 drives a removable recording medium 811 such as a magnetic disk, an optical disk, a magneto-optical disk, a semiconductor memory or the like.

In the computer configured as described above, the CPU 801 loads a program that is stored, for example, in the storage unit 808 onto the RAM 803 via the input/output interface 805 and the bus 804, and executes the program. Thus, the above-described series of processing is performed.

As one example, the program executed by the computer 800 (the CPU 801) may be provided by being recorded on the removable recording medium 811 as a packaged medium or the like. The program can also be provided via a wired or wireless transfer medium, such as a local area network, the Internet, or a digital satellite broadcast.

In the computer, by loading the removable recording medium 811 into the drive 810, the program can be installed into the storage unit 808 via the input/output interface 805. It is also possible to receive the program from a wired or wireless transfer medium using the communication unit 809 and install the program into the storage unit 416. As another alternative, the program can be installed in advance into the ROM 802 or the storage unit 808.

It should be noted that the program executed by a computer may be a program that is processed in time series according to the sequence described in this specification or a program that is processed in parallel or at necessary timing such as upon calling.

It should be also noted that, in this specification, the steps describing the program stored in the recording medium include not only a process performed in time series according to the sequence shown therein but also a process executed in parallel or individually, not necessarily performed in time series.

Further, in this specification, "system" refers to a whole device composed of a plurality of devices.

Further, an element described as a single device (or processing unit) above may be configured as a plurality of devices (or processing units). On the contrary, elements described as a plurality of devices (or processing units) above may be configured collectively as a single device (or processing unit). Further, an element other than those described above may be added to each device (or processing unit). Furthermore, a part of an element of a given device (or processing unit) may be included in an element of another device (or another processing unit) as long as the configuration or operation of the system as a whole is substantially the same. In other words, an embodiment of the disclosure is not limited to the embodiments described above, and various changes and modifications may be made without departing from the scope of the disclosure.

An embodiment of the disclosure is not limited to the embodiments described above, and various changes and modifications may be made without departing from the scope of the disclosure.

For example, the present disclosure can adopt a configuration of cloud computing which processes by allocating and connecting one function by a plurality of apparatuses through a network.

Further, each step described by the above mentioned flow charts can be executed by one apparatus or by allocating a plurality of apparatuses.

In addition, in the case where a plurality of processes is included in one step, the plurality of processes included in this one step can be executed by one apparatus or by allocating a plurality of apparatuses.

In the present specification, the examples in which the various pieces of information are multiplexed in the coding stream and are transmitted from the encoding side to the decoding side have been described. However, the methods of transmitting the information are not limited to the examples. For example, the information may be transmitted or recorded as separate pieces of data associated with the coding bit stream without being multiplexed in the coding bit stream. Here, the term "associated" means that an image (which may be a part of an image, such as a slice or a block) included in a bit stream and information corresponding to the image can be linked at the time of decoding. That is, the information may be transmitted along a different transmission path from the image (or the bit stream). The information may be recorded in a different recording medium (or a different recording area of the same recording medium) from the image (or the bit stream). Further, the information and the image (or the bit stream) may be mutually associated, for example, in any unit such as a plurality of frames, a single frame, or a part of a frame.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Additionally, the present technology may also be configured as below.

(1)

A file generation device, including:

a subsample information generation unit that defines a sample group of subsamples using a definition flag to define subsamples in a file including a bit stream generated by encoding content obtained by partitioning an image into a plurality of subsamples, and generates subsample access information to access subsamples; and a file generation unit that generates the file by multiplexing the subsample access information generated by the subsample information generation unit.

(2)

The file generation device according to (1), wherein the subsample information generation unit generates the subsample access information by mapping defined sample group of subsamples to a level.

(3)

The file generation device according to (1) or (2), wherein the subsample information generation unit generates the subsample access information by grouping together a sample group that expresses subsample position information and the sample group of subsamples, and then mapping to a level.

(4)

The file generation device according to any one of (1) to (3), wherein the subsample information generation unit generates the subsample access information by defining a sample group storing reference information to a sample group that expresses subsample position information and the sample group of subsamples to thereby group the sample groups together, and mapping the sample group storing the reference information to a level.

(5)

The file generation device according to any one of (1) to (3), wherein the subsample information generation unit generates the subsample access information by defining a sample group set bundling a sample group that expresses subsample position information and the sample group of subsamples to thereby group the sample groups together, and mapping the sample group storing the reference information to a level.

(6)

The file generation device according to any one of (1) to (3), wherein the subsample information generation unit generates the subsample access information by grouping together a sample group that expresses subsample position information and the sample group of subsamples, and then mapping each of the sample groups to respective levels.

(7)

The file generation device according to any one of (1) to (6), wherein the subsamples are tiles.

(8)

The file generation device according to any one of (1) to (7), wherein the subsamples are 3D audio.

(9)

The file generation device according to any one of (1) to (8), further including:

an encoding unit that encodes the content in which an image is partitioned into a plurality of subsamples, and thereby generates the bit stream.

(10)

A file generation method, including:

defining, by a file generation device, a sample group of subsamples using a definition flag to define subsamples in a file including a bit stream generated by encoding content obtained by partitioning an image into a plurality of subsamples, and generating subsample access information to access subsamples; and generating, by the file generation device, the file by multiplexing the generated subsample access information.

(11)

A content playback device, including:

an information acquisition unit that acquires subsample access information from a multiplexed file in which a sample group of subsamples is defined using a definition flag to define subsamples in a file including a bit stream generated by encoding content obtained by partitioning an image into a plurality of subsamples, and in which a subsample access information to access subsamples is thereby generated;

a sample acquisition unit that acquires arbitrary subsamples using the subsample access information acquired by the acquisition unit; and a playback unit configured to play back arbitrary subsamples acquired by the sample acquisition unit.

(12)

The content playback device according to (11), wherein the subsample access information is generated by mapping defined sample group of subsamples to a level.

(13)

The content playback device according to (11) or (12), wherein the subsample access information is generated by grouping together a sample group that expresses subsample position information and the sample group of subsamples, and then mapping to a level.

(14)

The content playback device according to any one of (11) to (13), wherein the subsample access information is generated by defining a sample group storing reference information to a sample group that expresses subsample position information and the sample group of subsamples to thereby group the sample groups together, and mapping the sample group storing the reference information to a level.

(15)

The content playback device according to any one of (11) to (13), wherein the subsample access information is generated by defining a sample group set bundling a sample group that expresses subsample position information and the sample group of subsamples to thereby group the sample groups together, and mapping the sample group storing the reference information to a level.

(16)

The content playback device according to any one of (11) to (13), wherein the subsample access information is generated by grouping together a sample group that expresses subsample position information and the sample group of subsamples, and then mapping each of the sample groups to respective levels.

(17)

The content playback device according to any one of (11) to (16), wherein the subsamples are tiles.

(18)

The content playback device according to any one of (11) to (16), wherein the subsamples are 3D audio.

(19)

The content playback device according to any one of (11) to (18), wherein the content is stored on a server connected via a network.

(20)

A content playback method, including:

acquiring, by a content playback device, subsample access information from a multiplexed file in which a sample group of subsamples is defined using a definition flag to define subsamples in a file including a bit stream generated by encoding content obtained by partitioning an image into a plurality of subsamples, and in which subsample access information to access subsamples is thereby generated;

acquiring, by the content playback device, arbitrary subsamples using acquired subsample access information; and playing back, by the content playback device, acquired arbitrary subsamples.

REFERENCE SIGNS LIST 10 information processing system
11 file generation device
12 web server
13 Internet
14 video playback terminal
21 streaming control unit
22 playback unit
23 HTTP access unit
31 audio playback unit
32 video playback unit
151 encoding unit
152 subsample information generation unit
153 MP4 file multiplexer
154 file transmission unit

The invention claimed is:

1. A file generation device, comprising:
an encoding unit configured to:
encode content corresponding to a first sample group, wherein the first sample group comprises a plurality of subsamples; and
generate a bit stream corresponding to the encoded content;
a subsample information generation unit configured to:
define the first sample group in a file based on definition flags,
wherein the file includes the generated bit stream;
define a second sample group to a third sample group and the defined first sample group,
wherein the second sample group stores reference information, and
the third sample group includes subsample position information;
group the second sample group, the third sample group, and the defined first sample group, as a fourth sample group;
map the fourth sample group to a level corresponding to a data type of at least one object of the encoded content; and
generate subsample access information to access each of the plurality of subsamples, based on the mapped fourth sample group; and a file generation unit configured to:
multiplex the subsample access information generated to access the plurality of subsamples; and
generate the file, based on the generated bit stream and the multiplexed subsample access information.

2. The file generation device according to claim 1, wherein
the plurality of subsamples are tiles that correspond to an image included in the encoded content.

3. The file generation device according to claim 1, wherein
the plurality of subsamples are 3D audio data that corresponds to the encoded content.

4. The file generation device according to claim 1, wherein
the encoded content includes an image that is partitioned into a plurality of subsamples.

5. The file generation device according to claim 1, wherein
the subsample access information comprises a sample group description box, a level assignment box, and a subsegment index box.

6. The file generation device according to claim 1, wherein
the definition flags define a type of each of the plurality of subsamples,
wherein the type of each of the plurality of subsamples includes one of a NAL unit based subsample, decoding unit based subsample, tile based subsample, CTU row based subsample, or slice based subsample.

7. A file generation method, comprising:
encoding content corresponding to a first sample group, wherein the first sample group comprises a plurality of subsamples; and
generating a bit stream corresponding to the encoded content;
defining, by a file generation device, the first sample group in a file based on definition flags,
wherein the file includes the generated bit stream;
defining, by the file generation device, a second sample group to a third sample group and the defined first sample group,
wherein the second sample group stores reference information, and the third sample group includes subsample position information;
grouping, by the file generation device, the second sample group, the third sample group, and the defined first sample group, as a fourth sample group;
mapping, by the file generation device, the fourth sample group to a level corresponding to a data type of at least one object of the encoded content; and
generating subsample access information, to access each of the plurality of subsamples, based on the mapped fourth sample group;
multiplexing the subsample access information generated to access the plurality of subsamples; and
generating, by the file generation device, the file based on the generated bit stream and the multiplexed subsample access information.

8. A content playback device, comprising:
an information acquisition unit configured to:
acquire subsample access information, to access a plurality of subsamples in a first sample group, based on a fourth sample group, from a multiplexed file,
wherein, in the multiplexed file, the first sample group is defined based on definition flags,
wherein the multiplexed file includes a bit stream generated by an encode operation on content,
wherein a second sample group is defined to a third sample group and the defined first sample group,
wherein the second sample group stores reference information, and the third sample group includes subsample position information,
wherein the second sample group, the third sample group, and the defined first sample group are grouped as the fourth sample group,
wherein the fourth sample group is mapped to a level corresponding to a data type of at least one object of the encoded content, and
wherein the encoded content is acquired by partition of an image into the plurality of subsamples;
a sample acquisition unit configured to acquire arbitrary subsamples based on the acquired subsample access information; and
a playback unit configured to play back the acquired arbitrary subsamples.

9. The content playback device according to claim 8, wherein
the plurality of subsamples are tiles that correspond to the image.

10. The content playback device according to claim 8, wherein
the plurality of subsamples are 3D audio data that corresponds to the encoded content.

11. The content playback device according to claim 8, further comprising:
a transmission unit configured to transmit the encoded content to a server connected via a network,
wherein the server stores the encoded content.

12. A content playback method, comprising:
acquiring, by a content playback device, subsample access information, to access a plurality of subsamples in a first sample group, based on a fourth sample group, from a multiplexed file,
wherein, in the multiplexed file, the first sample group is defined based on definition flags,
wherein the multiplexed file includes a bit stream generated by encoding content,
wherein a second sample group is defined to a third sample group and the defined first sample group,
wherein the second sample group stores reference information, and the third sample group includes subsample position information,
wherein the second sample group, the third sample group, and the defined first sample group are grouped as the fourth sample group,
wherein the fourth sample group is mapped to a level corresponding to a data type of at least one object of the encoded content, and
wherein the encoded content is acquired by partitioning an image into the plurality of subsamples;
acquiring, by the content playback device, arbitrary subsamples based on the acquired subsample access information; and
playing back, by the content playback device, the acquired arbitrary subsamples.

* * * * *